No. 805,230. PATENTED NOV. 21, 1905.
J. P. PAYNTER.
VOTING MACHINE.
APPLICATION FILED APR. 23, 1902.
11 SHEETS—SHEET 4.
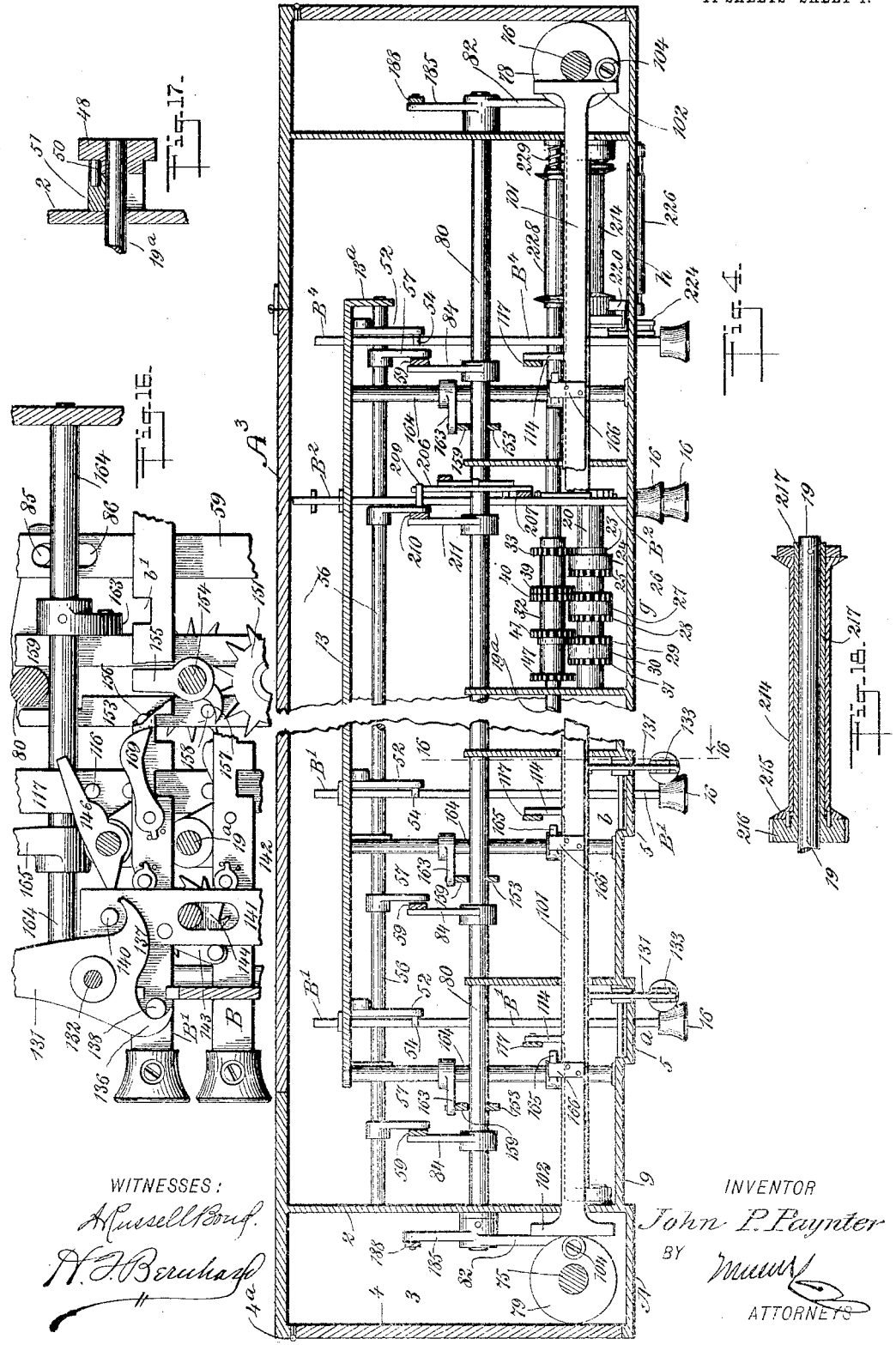
WITNESSES:
INVENTOR
John P. Paynter
BY
ATTORNEYS No. 805,230. PATENTED NOV. 21, 1905.
J. P. PAYNTER.
VOTING MACHINE.
APPLICATION FILED APR. 23, 1902.
11 SHEETS—SHEET 5.
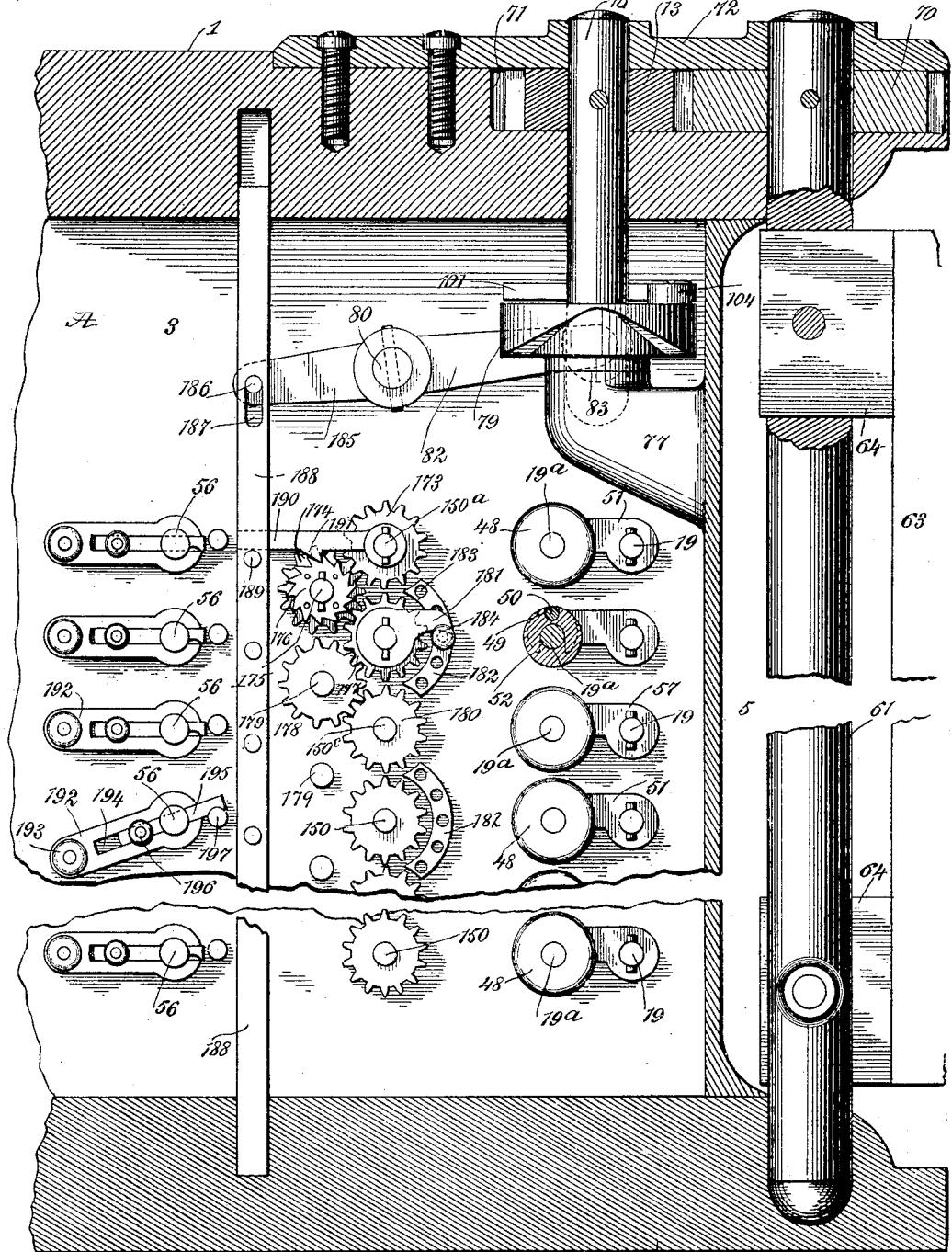
WITNESSES: INVENTOR
John P. Paynter
BY
ATTORNEYS No. 805,230. PATENTED NOV. 21, 1905.
J. P. PAYNTER.
VOTING MACHINE.
APPLICATION FILED APR. 23, 1902.
11 SHEETS—SHEET 6.
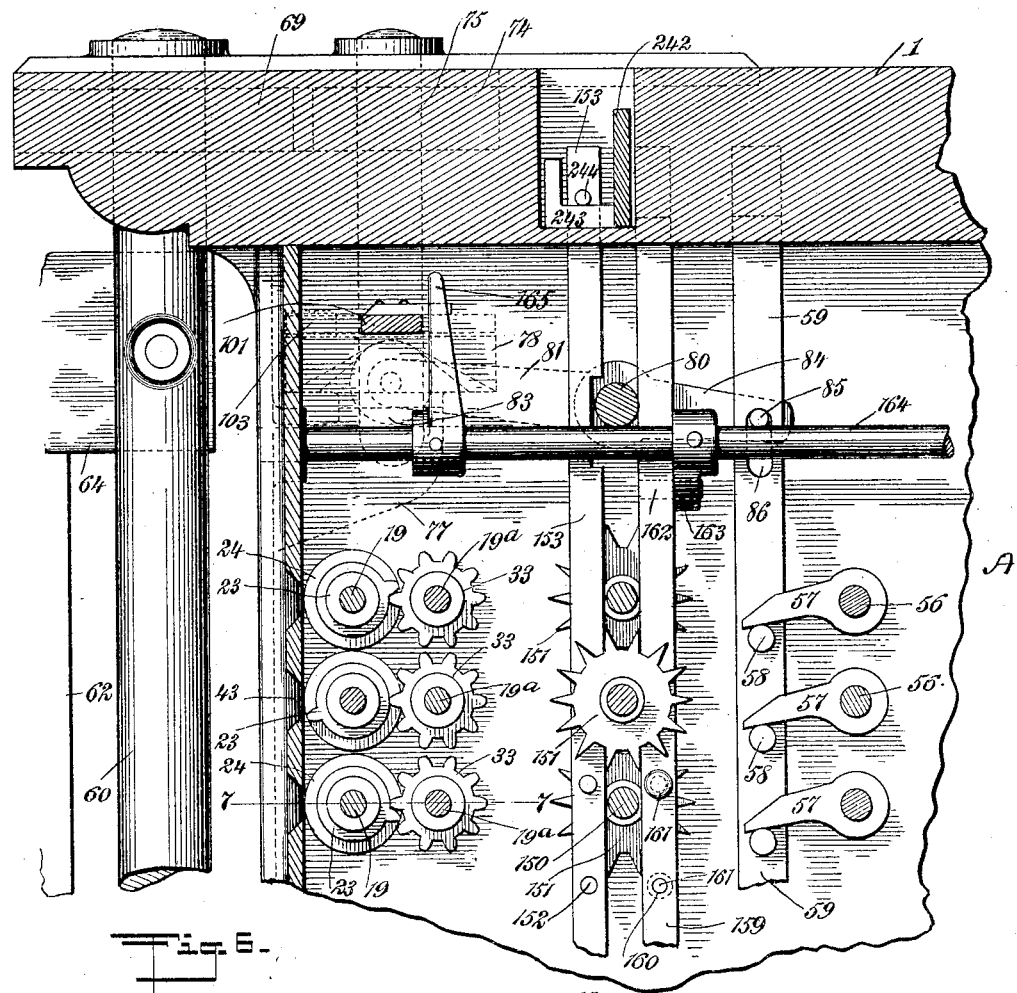
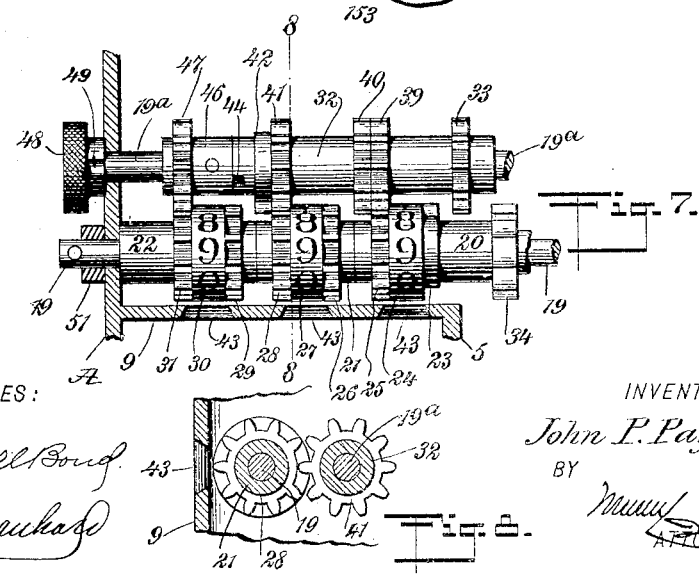
WITNESSES:
INVENTOR
John P. Paynter
BY
ATTORNEYS No. 805,230. PATENTED NOV. 21, 1905.
J. P. PAYNTER.
VOTING MACHINE.
APPLICATION FILED APR. 23, 1902.
11 SHEETS—SHEET 7.
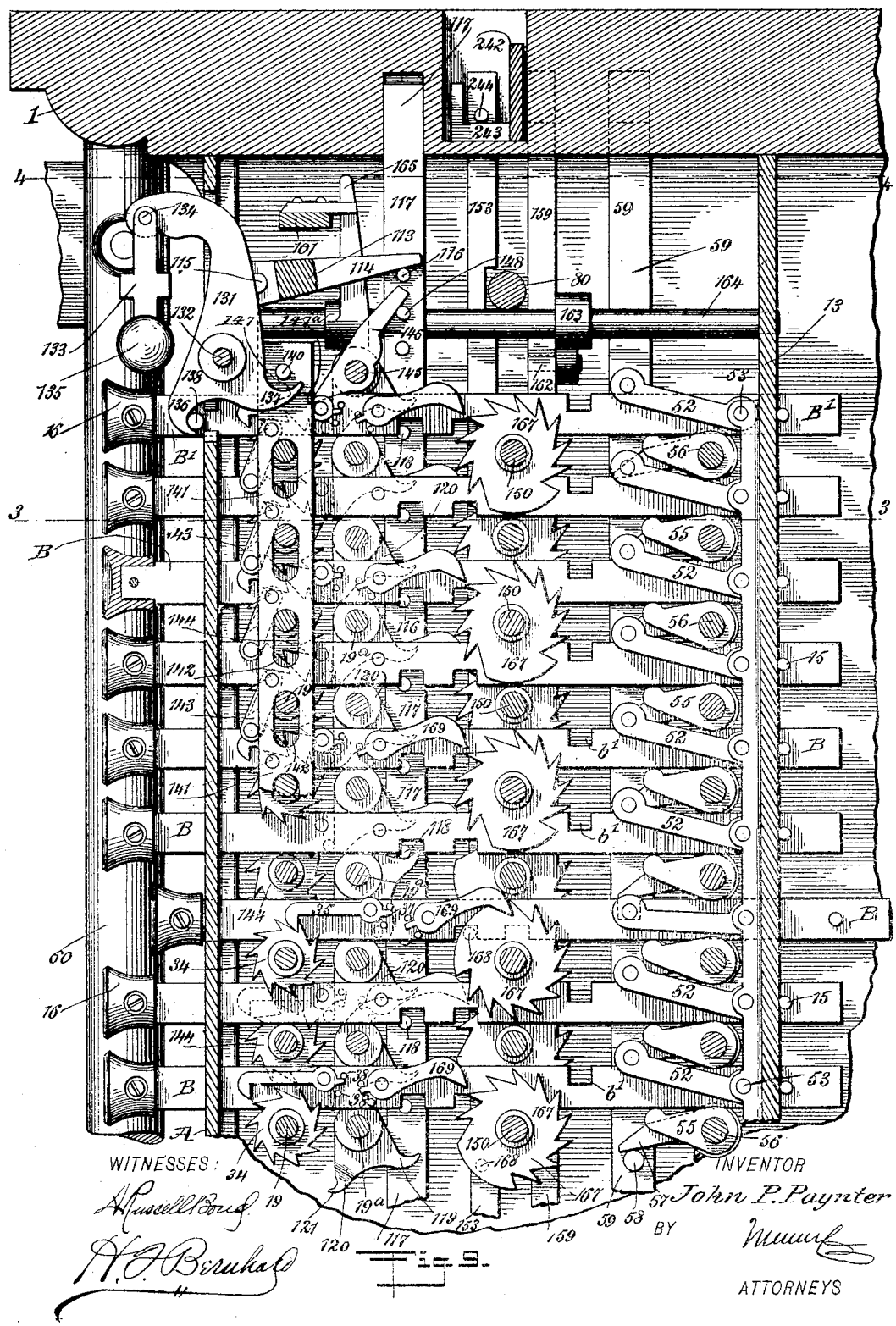
WITNESSES:
INVENTOR
John P. Paynter
BY
ATTORNEYS No. 805,230. PATENTED NOV. 21, 1905.
J. P. PAYNTER.
VOTING MACHINE.
APPLICATION FILED APR. 23, 1902.
11 SHEETS—SHEET 8.
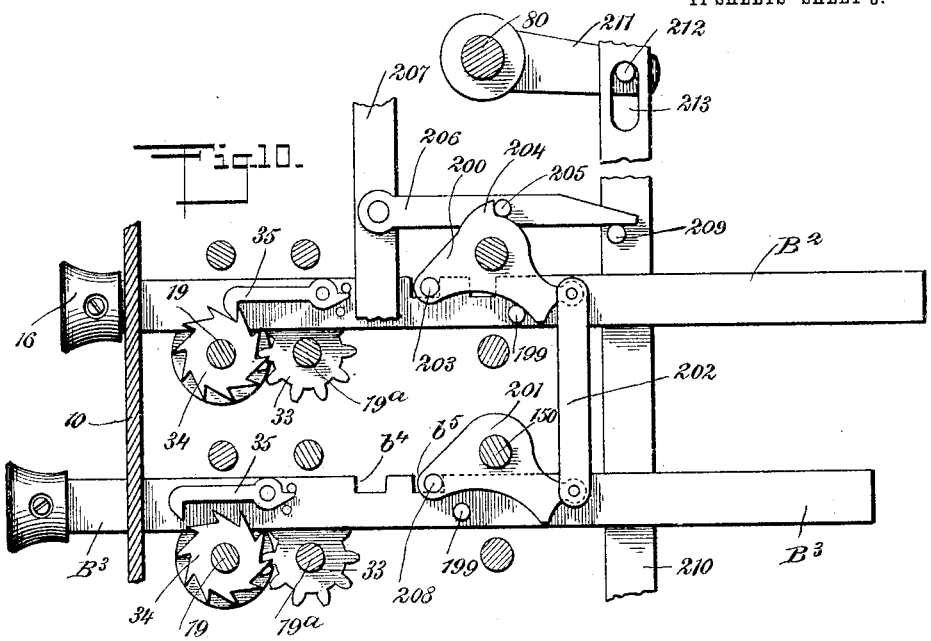
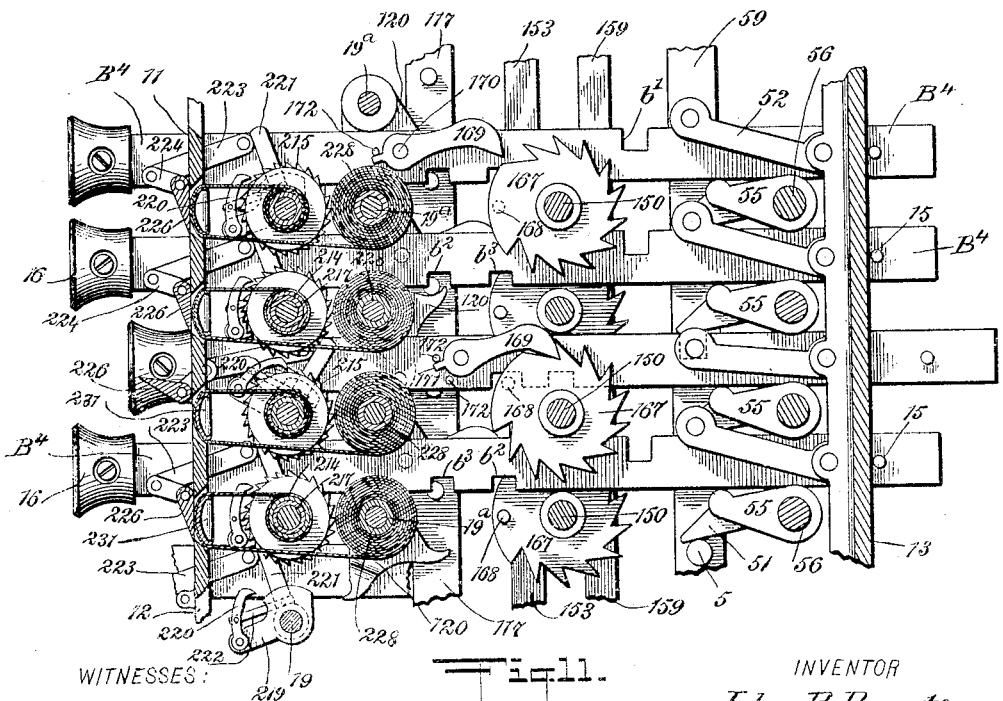
WITNESSES:
INVENTOR
John P. Paynter
BY
ATTORNEYS

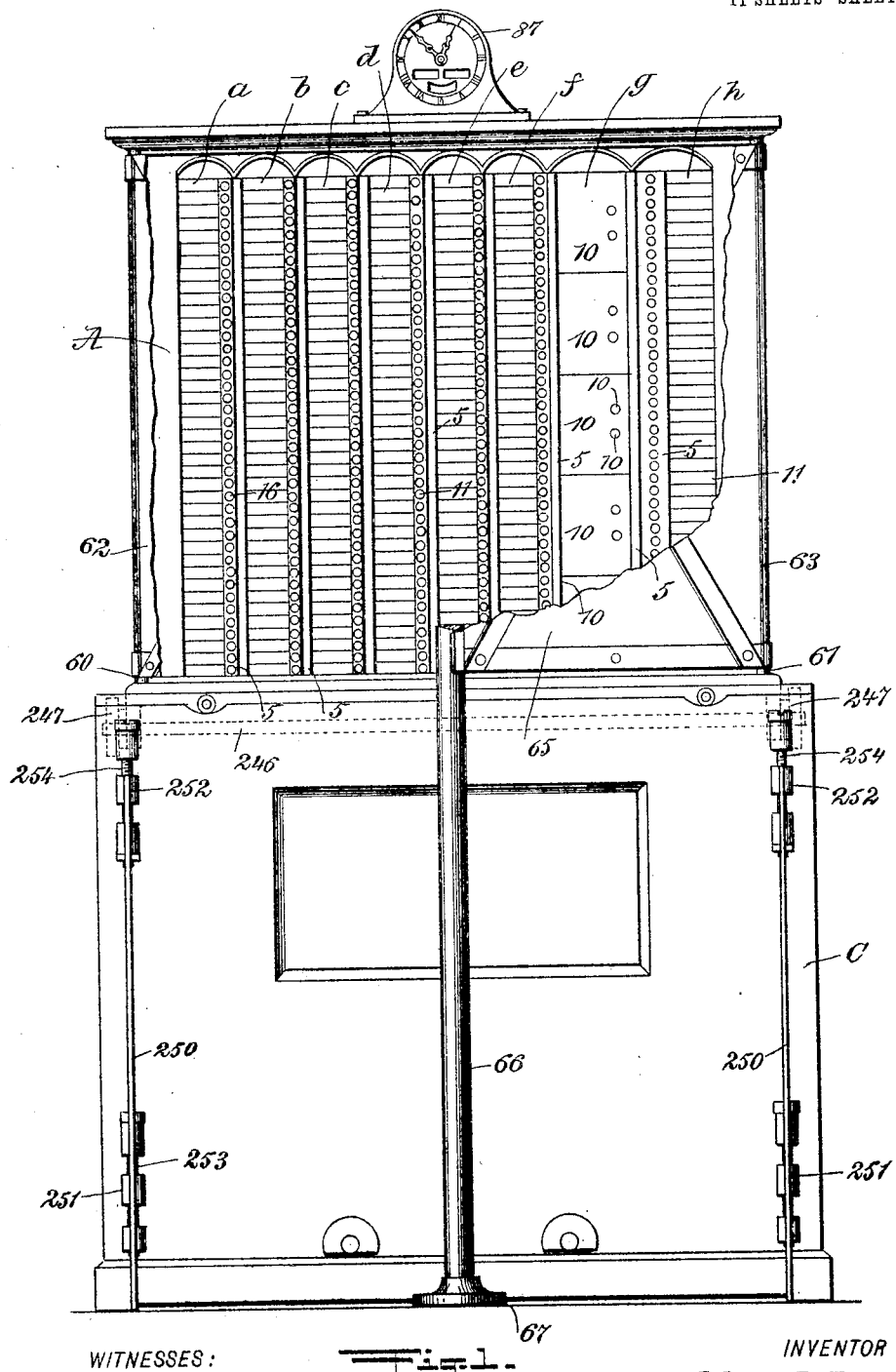

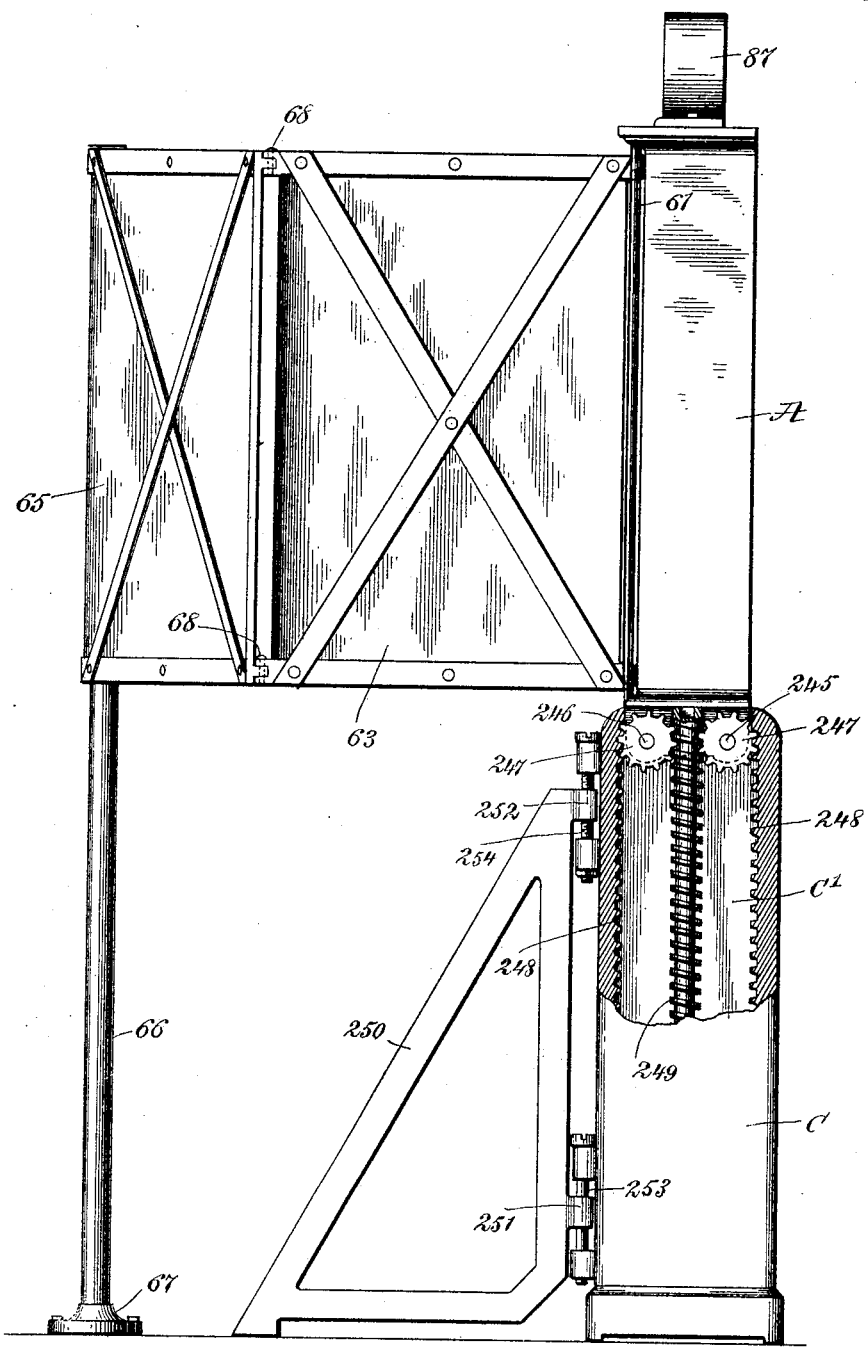

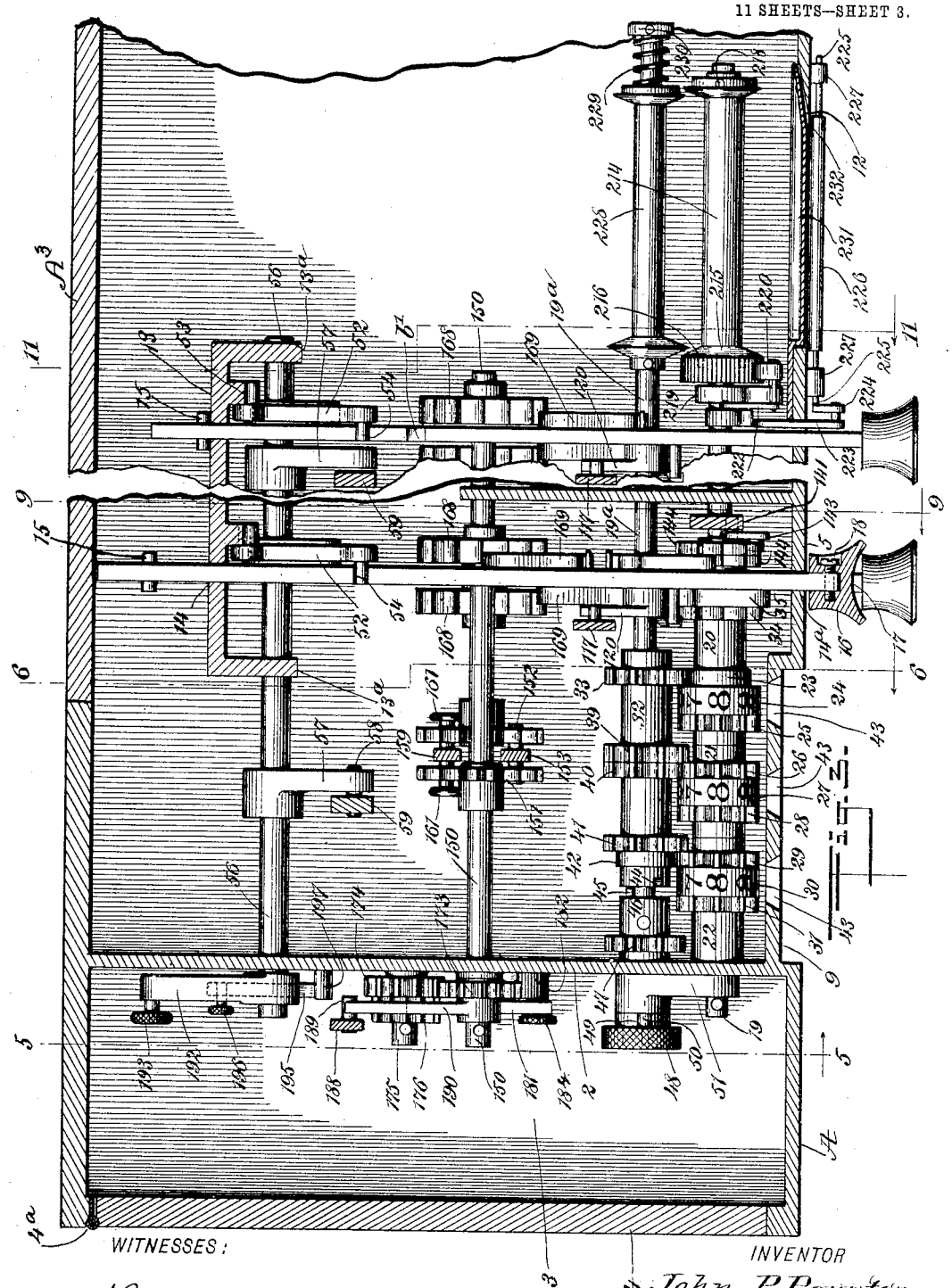

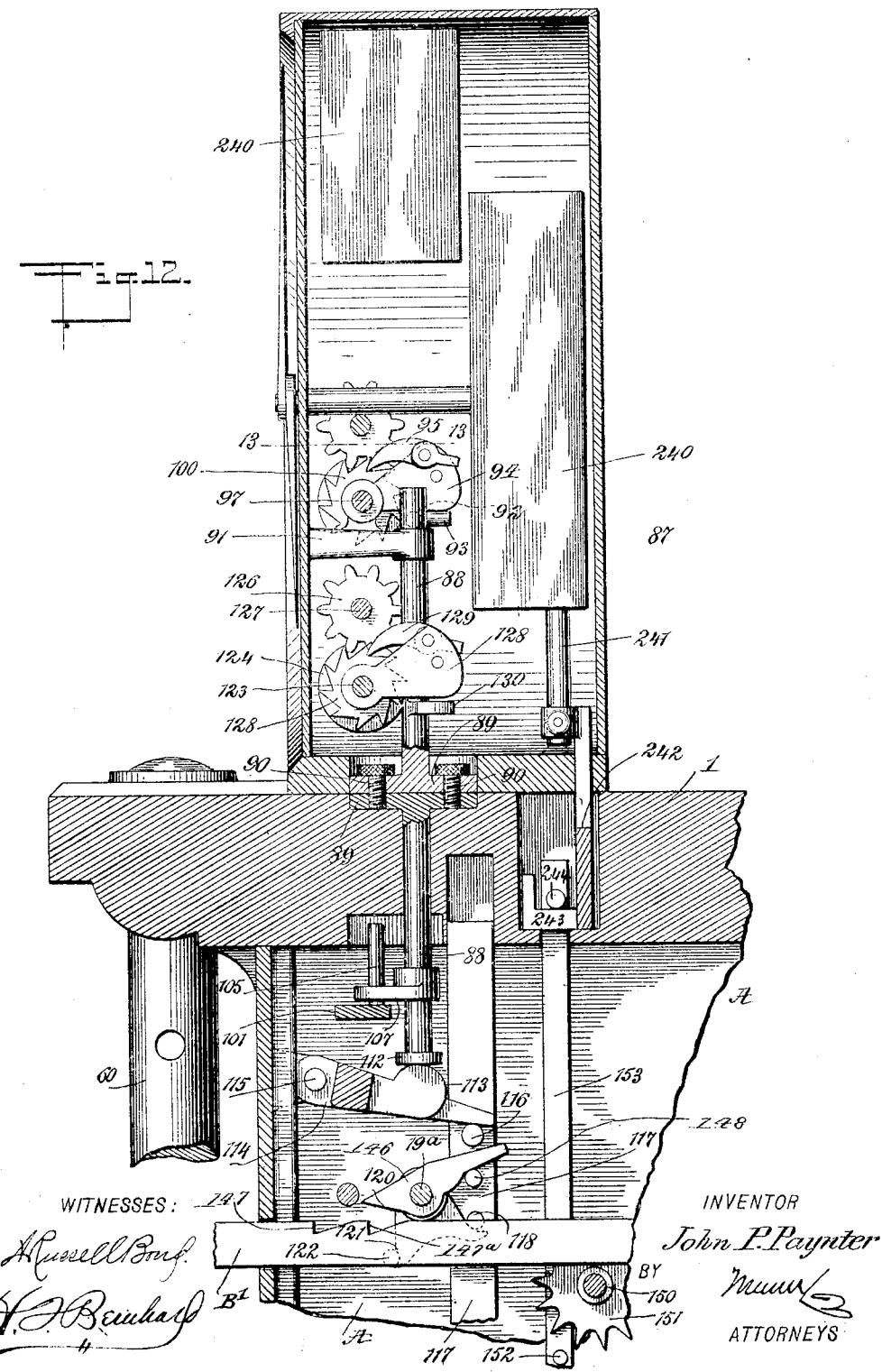

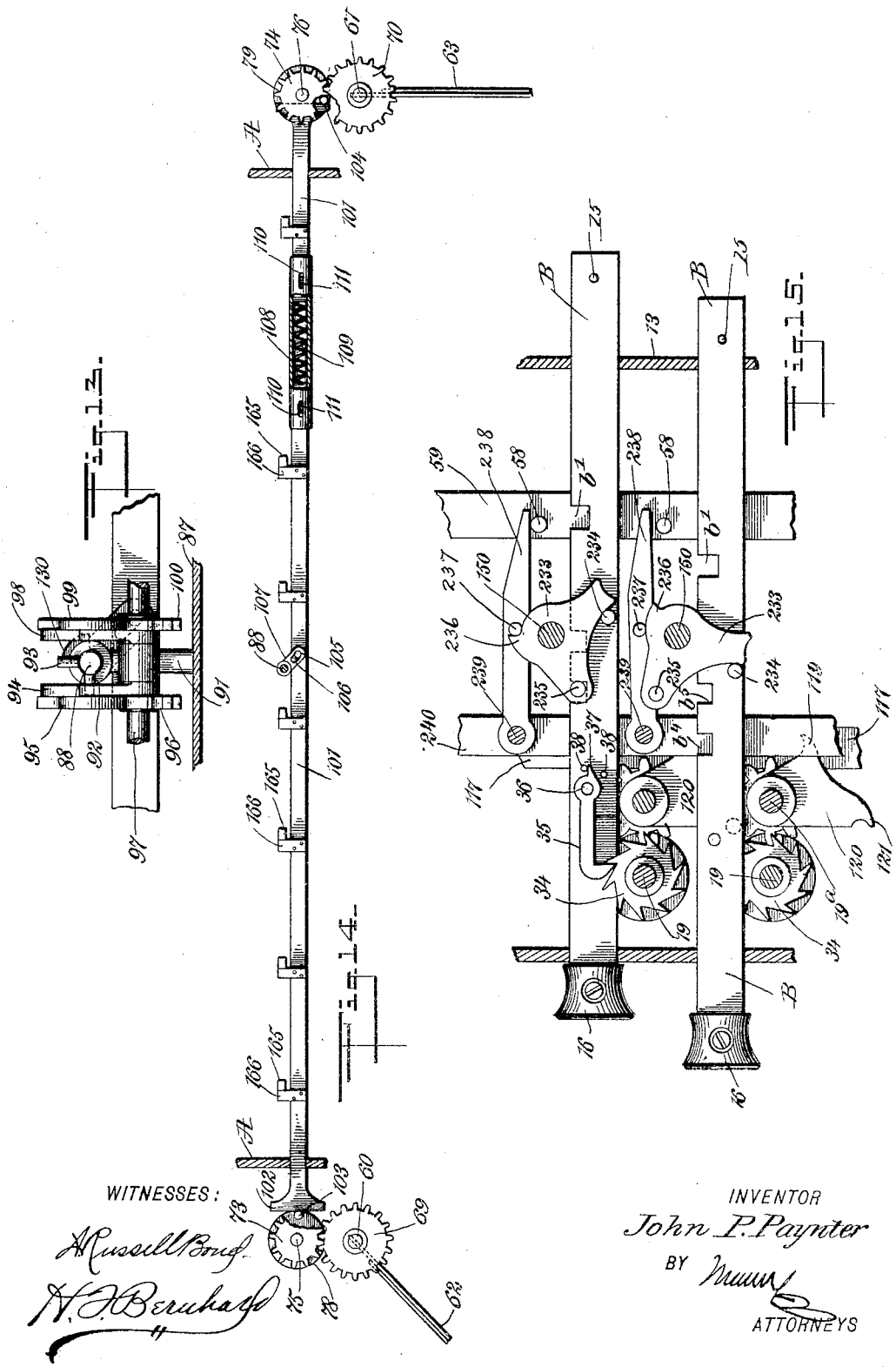

No. 805,230. PATENTED NOV. 21, 1905.
J. P. PAYNTER.
VOTING MACHINE.
APPLICATION FILED APR. 23, 1902.

11 SHEETS—SHEET 11.

WITNESSES:

INVENTOR
John P. Paynter
BY
ATTORNEYS.

UNITED STATES PATENT OFFICE.

JOHN PHILLIP PAYNTER, OF TOPEKA, KANSAS.

VOTING-MACHINE.

No. 805,230.　　　　Specification of Letters Patent.　　　　Patented Nov. 21, 1905.

Application filed April 23, 1902. Serial No. 104,421.

*To all whom it may concern:*

Be it known that I, JOHN PHILLIP PAYNTER, a citizen of the United States, residing at Topeka, in the county of Shawnee and State of Kansas, have invented certain new and useful Improvements in Voting-Machines, of which the following is a full, clear, and exact description.

My invention relates to improvements in voting-machines in which I have provided automatic mechanisms adapted to accurately register the votes as they are cast, so as to keep a true account of the number of votes cast at an election without the use of printed ballots.

Among the several objects of my invention are, first, to prevent fraudulent voting by providing certain safeguards of a mechanical nature; second, to protect the voter from espionage while giving him unrestricted choice as to candidates and parties; third, to provide certain improvements in construction and operation whereby the general purposes of a voting-machine are carried out more efficiently.

With these ends in view the invention consists in the novel combinations of mechanisms and in the construction, arrangement, and adaptation of the various parts for service, as will be hereinafter fully described and claimed.

Reference is to be had to the accompanying drawings, forming part of this specification, in which similar characters of reference indicate corresponding parts in all the figures.

Figure 19:
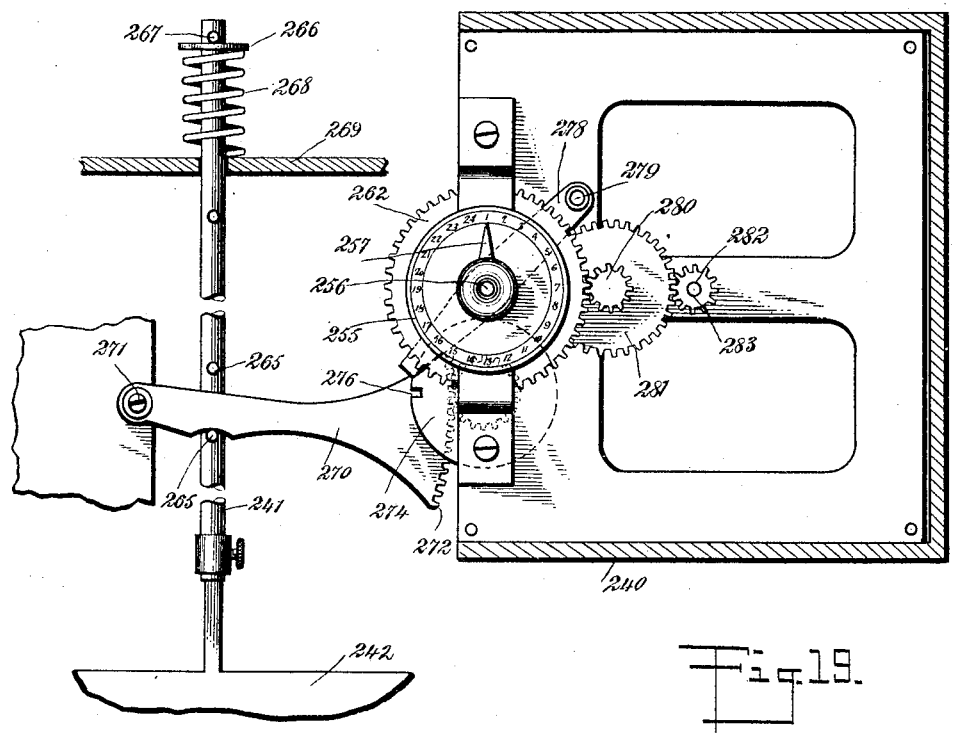
Figure 20:
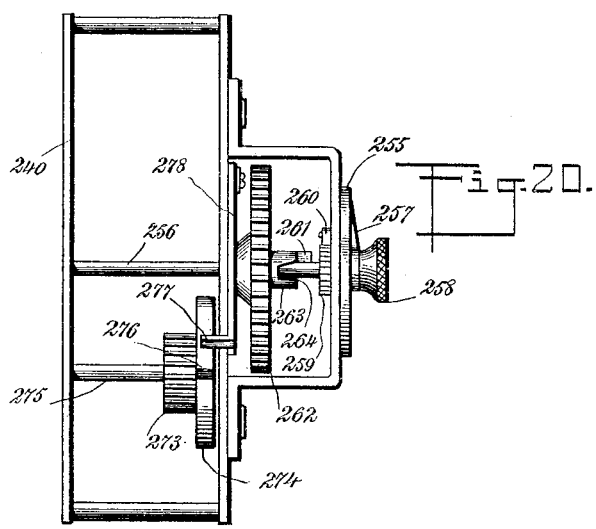

Figure 1 is a front elevation of a voting-machine constructed in accordance with the principles of my invention and showing the complete machine set up in condition for service, a part of the booth being broken away in order to illustrate the front portion of the voting mechanism. Fig. 2 is a side elevation of the complete machine set up in condition for use and representing a part of the base or stand broken away and in section in order to show the mechanism for vertically adjusting the machine proper with relation to the base and for sustaining the machine proper in its raised operative position. Fig. 3 is a horizontal section taken through the machine from front to rear and in the plane indicated by the dotted line 3 3 of Fig. 9, that part of the machine between the first and last columns of voting mechanisms being omitted and the casing being broken away. Fig. 4 is a sectional plan view taken in the plane above the voting mechanisms and indicated by the dotted line 4 4 of Fig. 9. Fig. 5 is a vertical transverse section taken through an end portion of the machine in the plane of the dotted line 5 5 of Fig. 3 and looking in the direction of the arrow in order to show a part of the mechanism adapted for cumulative or multiple voting, said view also representing the resetting mechanism for the individual registers of the push-slides and showing the casing broken away horizontally. Fig. 6 is a vertical transverse section through the upper part of the machine in the plane of the dotted line 6 6 of Fig. 3 looking in the direction indicated by the arrow and showing the individual registers associated with three of the push-slides, two sets of locking devices, which will be hereinafter described, and a portion of the locking mechanisms for the individual push-slides. Fig. 7 is a sectional plan view illustrating in detail one of the individual registers for one of the plurality of push-slides, the plane of the section being indicated by dotted line 7 7 of Fig. 6. Fig. 8 is a detail cross-section on the line 8 8 of Fig. 7, illustrating the mutilated-gear devices that are employed in the individual registers for the separate push-slides. Fig. 9 is a vertical transverse section taken in the plane of the dotted line 9 9 of Fig. 3 looking in the direction of the arrow and showing a number of the push-slides employed in one column, said view representing the slide-locking devices and the mechanism employed in connection with each slide to permit cumulative voting. Fig. 10 is an enlarged vertical section through one of the voting-register devices employed in the special-proposition or amendment column, said view being taken in the plane of the dotted line 10 10 of Fig. 1. Fig. 11 is a vertical transverse sectional view through the opposite end portion of the machine from that shown by Fig. 5, the plane of the section being indicated by the dotted line 11 11 of Fig. 3, looking in the direction of the arrow and representing in detail a number of devices which permit independent voting for individuals who are not the nominees of any political party. Fig. 12 is an enlarged vertical sectional elevation through the public-register mechanism which surmounts the top of the machine-casing, said view representing the mechanism employed in the voting-machine as the means for operating the individual and aggregate public registers. Fig. 13 is a detail sectional plan view on the line 13 13 of Fig. 12, representing the shiftable devices whereby the male or female public registers may be controlled by the opening of the doors or screens forming the booth. Fig. 14 is an enlarged sectional view through the shifter-bar adapted to control the male or female counting mechanisms of the public register, said bar being actuated in one direction or the other by the opening and closing of the men's and women's doors of the booth. Fig. 15 is an enlarged detail sectional view showing two of the push-slides and one form of detent mechanism therefor, the described form of detent mechanism being especially adapted for use in said mechanism with said push-slides when the machine is not intended to allow cumulative or multiple voting. Fig. 16 is a detail view showing means operated by the slide of the straight-ticket mechanism to restrain the primary locking mechanism from movement when a straight ticket for any one political party is voted, the plane of the section being indicated by the dotted line 16 16 of Fig. 4. Fig. 17 is a detail of the means for locking the thumb-piece 48 for the resetting device of the register. Fig. 18 is a detail of the take-up spool for one independent-voting device. Fig. 19 is a sectional elevation of one form of time-controlled mechanism whereby the multiple-locking mechanism of the machine may be automatically brought into service, and Fig. 20 is a view in elevation of a part of the time-controlled mechanism shown by Fig. 19.

A designates the casing which incloses the operating mechanisms of my improved voting-machine. This casing is constructed, preferably, of metal in order to avoid the employment of wood and other perishable material and to produce a structure which will withstand the action of the weather and also exclude dust and moisture from the operating mechanisms. The casing is provided with a substantial top piece 1, and in one side portion of the casing is provided a partition 2, which forms a chamber 3, access to which is obtained by means of the hinged side 4, the latter arranged to close flush with the casing and hinged to the back thereof, as at 4$^a$. The front of the casing is divided by a series of vertical parting-strips 5 into a plurality of vertical columns, which are indicated by the reference-letters $a\ b\ c\ d\ e\ f\ g\ h$, each column having a panel 9 placed between two adjacent parting-strips 5 and preferably set in from the front of the casing, so as to leave a space or channel adapted to receive cards to contain the names of the candidates of the different political parties. The front of the machine-casing is divided, preferably, into eight columns, and of these columns those indicated at $a\ b\ c\ d\ e\ f$ are adapted to receive the cards containing the names of the candidates for the six leading or prominent political parties, each column adapted to contain forty push-slides and the necessary number of individual registers and the other mechanisms associated with said push-slides. Of the forty push-slides provided in each of the six columns one is intended to be operated by the voter when it is desired to vote a straight ticket or, in other words, when the voter desires, by the operation of a single device, to cast his vote for all the candidates of any one political party, whereas the remaining thirty-nine push-slides of the series in each column are intended to represent the individual candidates or nominees of one political party. Of course the number of push-slides and the number of columns may be varied at will, and the described construction and arrangement is merely in exemplification of the invention. The other column (indicated at $g$ in Fig. 1) is adapted to be devoted to special propositions or amendments which it is desired to submit to the choice of the people, and in this column is provided a series of devices adapted for "aye" and "nay" voting. The column $g$ contains a vertical series of panels (indicated at 10) and disposed in the set-in order described in relation to the panels 9 in the other columns $a$ to $f$, inclusive. The other column $h$ (indicated by Fig. 1) has a front panel 11, which is also set in so as to lie in the rear of the parting-strips 5, and this panel 11 of the column $h$ (shown by Figs. 1, 3, and 11) is provided with a series of slots 12, said panel 11 having a number of transverse slots disposed in horizontal parallel order and in vertical series, the number of slots corresponding to the number of push-buttons in the other columns $a$ to $f$, inclusive, of the machine-casing. The column $h$ is equipped with a plurality of push-slides which control individually a plurality of paper tapes or bands, each of which is exposed for a part of its length through one of the slots 12 in a manner to permit the voter to inscribe or write the name of a person that does not appear in the list of the candidates of the parties in the columns $a$ to $f$, inclusive, all as will hereinafter more fully appear.

In the rear portion of the main compartment of the casing A is provided a vertical frame-plate 13, having a plurality of vertical flanges 13$^a$, and this frame-plate is provided with a very large number of guide-openings 14, adapted to register with other guide-openings 14$^a$, which are provided in the front of the casing or the parting-strips 5 therein, as shown more clearly by Fig. 3.

B designates push-slides adapted for the individual candidates in the columns $a$ to $f$, inclusive, and B' is the straight-ticket push-slide forming one of the series of slides in each column $a$ to $f$, inclusive. As hereinbefore indicated, I employ forty, more or less, of these slides B B' in each of the six columns $a$ to $f$, inclusive; but as all these series of slides in these six columns are essentially the same in construction and operation I have considered it necessary to only show a portion of one of the series of push-slides in one of the columns, this particular illustration being embraced in Figs. 3, 6, and 9. Each slide B or B' is arranged in a horizontal position, so that it may move freely in two of the coincident openings 14 14ᵃ, provided in the frame-plate 13 and the front of the casing, respectively. The push-slide is provided near its inner end with the stop pins or studs 15, that lie in rear of the frame-plate and are adapted to prevent withdrawal of the slide in a forward direction. The front end of the slide is exposed beyond the front of the casing, and to this slide is secured the push-button 16, the same having a countersunk concave cavity 17 in its exposed face and said push-button being attached firmly to the slide by means of the screw 18, as shown more clearly by Figs. 3 and 9. It is intended to arrange the slides B B' so that the voter can insert the finger in the cavity 17 of one push-button in order to press one slide backwardly into the casing, whereby the push-buttons can easily be operated individually and the voter is not liable to press any more than one slide.

In my improved machine I employ a multiplicity of individual registers, which occupy operative relation to the individual slides B, so as to be actuated individually thereby in order to keep a tally of the number of votes which are cast for the candidates or electors of the parties, and this machine also embodies a public-register mechanism which is exposed to view at all times of persons located outside of the booth or the machine, such public-register mechanism being divided into individual-counting mechanisms adapted to indicate the number of men and women who have entered the booth and another total-counting mechanism, which will register the total number of votes that have been cast.

I will now proceed to describe in detail one of the individual-register mechanisms that is adapted to be actuated by one of the slides B, reference being had more particularly to Figs. 3, 6, 7, and 8.

19 designates a series of horizontal arbors or spindles which are arranged across the front part of the machine in the positions shown more clearly by Figs. 6 and 9. These arbors are disposed in the same vertical plane near the front of the machine, and they lie between or in alternate relation to the slides B, said arbors being supported in the machine frame or casing by any suitable means, so as to occupy stationary positions therein. The arbors sustain parts of the registering mechanisms associated with the slides for the entire series of columns $a$ to $g$, inclusive, and for the registering mechanisms and the paper-tape-feed mechanisms in the column $h$ for the independent voting.

Each individual register mechanism has a series of sleeves 20 21 22, which are loosely mounted on one arbor 19, so as to lie between one slide and the partition 2 or any two slides in adjacent columns of the machine. The sleeve 20 (shown by Figs. 3 and 7) is provided with a wheel 23, having a single tooth. It is also provided with the units-wheel 24 and with a resetting-wheel 25, having eight teeth, said resetting-wheel being shown by Fig. 8 and forming one of the train of mutilated gears. The next sleeve 21 is provided with a gear 26, having ten teeth, a tens-wheel 27, and a mutilated gear-wheel 28, the latter also having eight teeth with a broken-out space, as indicated by Fig. 8. The last sleeve 22 is provided with a wheel 29, having ten teeth, a hundredths-wheel 30, and a resetting-wheel 31, having a series of eight teeth, thus forming another mutilated gear.

In rear of the tier of arbors 19 is arranged another tier of horizontal arbors 19ᵃ, the same corresponding in number to the arbors 19, arranged in the same vertical plane and in alternate relation to the slides B in each column. These arbors 19ᵃ, constituting the second tier, are adapted to support certain parts of the register mechanisms connected with the different slides B in the different columns.

On each arbor 19ᵃ is loosely mounted a sleeve 32, the same being disposed immediately in rear of the series of sleeves 20 21 22 of each individual-register mechanism. This single sleeve 32 is fitted loosely on one of the arbors 19ᵃ, so as to turn freely thereon, and the said sleeve 32 is provided with a gear-wheel 33, having ten teeth, the latter adapted to have intermeshing engagement with the single tooth on the wheel 23 of the sleeve 20, whereby the sleeve 32 may be turned one-tenth of a revolution at each complete turn of the wheel 23 on the sleeve 20. Said sleeve 20 is operated directly from and by the movement of one of the slides B, and to this end I provide the sleeve 20 with a ratchet-wheel 34, the same having a series of ten teeth and adapted to be engaged with a feed-pawl 35, said feed-pawl being pivoted or hung, as at 36, directly to one of the slides B and provided with a toe-piece 37, the latter working between a pair of fixed stops 38, which are provided on the slide. (See Figs. 9 and 15.) The feed-pawl 35 is thus mounted on the slide B, so as to travel therewith and is capable of a limited movement on the forward movement of the slide, so as to ride idly over one of the teeth of the ratchet 34. The stop-pins 38 are adapted to coact with the toe-piece 37, so as to limit the oscillation of the pawl on its pivot 36, thus preventing the pawl from flying out of position and obviating the necessity of employing a spring to hold the pawl in its active position. It will be understood, therefore, that the inward movement of the slide B by the pressure of the voter's finger against the thumb-piece 16 will carry the pawl with the slide and turn the ratchet 34 the distance of one tooth. The rotation of the ratchet 34 will turn the sleeve 20 one-tenth of a revolution, and when the sleeve, its wheel 23, the units-wheel 24, and the gear 25 have made one complete revolution the single tooth of the wheel 23 will actuate the gear 33 on the sleeve 32, so as to turn the latter one-tenth of a revolution. The sleeve 32 is provided with a resetting-wheel 39, having ten teeth, and the gear-wheel 40, also having ten teeth, said gear-wheel 40 adapted to have intermeshing engagement with the ten-toothed gear 26 of the units-wheel 27 on the sleeve 21, whereby the tenths-wheel 27 will be rotated one-tenth of a revolution at each complete turn of the sleeve 20 and the units-wheel 24. The sleeve 32 is, furthermore, provided with a resetting-wheel 41, having a series of ten teeth, and with a wheel 42, having one tooth, said wheel 42 adapted to engage on each complete rotation of the sleeve 32 with the ten-toothed wheel 29, which is fast with the sleeve 22, that carries the hundredths-wheel 30, whereby said hundredths-wheel 30 will be rotated one-tenth of a revolution at each complete turn of the sleeve 32, and the hundredths-wheel will make a complete revolution when the slide B shall have been operated one hundred times. The wheels 24, 27, and 30 of the individual register are inscribed with proper numerals from "0" to "9," inclusive, and they are disposed in rear of the observation-openings 43, the latter being provided in the panel 9 of the casing.

The sleeve 32 is provided at one end with a notch 44, which is adapted to be engaged by a clutch-pin 45 on a resetting-sleeve 46, the latter being pinned or otherwise made fast to one of the slidable arbors 19ª, as shown by Fig. 3. This resetting-sleeve is provided with a gear 47, having ten teeth, and the sleeve passes through the partition 2 at the left-hand side of the machine-frame. The protruding end of the arbor 19ª is provided with a thumb-piece 48, in which is formed a notch 49, adapted to receive a stud or pin 50 on an adjustable locking-arm 51. This locking-arm is fitted loosely on a protruding end of one of the arbors 19ª, as shown by Figs. 3, 5, and 7, and said locking-arm is provided with a forked extremity 52, the latter being indicated by dotted lines in Fig. 5 and adapted to straddle the notched part of the thumb-piece 48.

From this description it will be plain that the locking-arm 51 is loosely mounted on one of the arbors and that its forked end is engaged with the thumb-piece 48, said forked end of the locking-arm having a pin 50, adapted to enter the notch 49. The forked end of the locking-arm is disposed between the partition 2 and the thumb-piece 48, so as to hold the sleeve 46 in a position where its clutch-pin 45 is free from engagement with the notch 44 of the sleeve 32 of the register mechanism. The engagement of the stud 50 on the locking-arm with the notch 49 of the thumb-piece prevents the sleeve 46 from turning on its axis, and the interposition of the forked end of the arm between the partition and the thumb-piece overcomes the inward sliding movement of the sleeve 46 toward the sleeve 32, whereby the sleeve 32 is adapted to turn freely in the operation of the register mechanism by the inward movement of the slide B.

After the election is over and it is desired to restore the individual registers to their initial positions the arm 51 is lifted so as to withdraw its stud 50 from the notch in the thumb-piece, and this thumb-piece may now be turned so as to rotate the sleeve, and these parts may then be shoved inward in order to bring the clutch-pin 45 into engagement with the notch 44 of the sleeve 32. The sleeve 32 may now be adjusted by a further inward movement of the sleeve 46, so that the gear-wheel 47 will mesh with the gear-wheel 31, the gear-wheel 41 will mesh with the gear-wheel 28, and the gear-wheel 39 will mesh with the gear-wheel 25. In view of the fact that the gear-wheels 31, 28, and 25 are all mutilated gears having only eight teeth with an intermediate gap or space, as shown by Fig. 8, it is evident that the indicating-wheels of the register mechanism may all be reset to zero by simply turning a thumb-piece 48 in the proper direction. The adjustment of this thumb-piece 48 turns the clutch-connected sleeves 46 32, which serve to rotate the gears 47, 41, and 39, and as these gears have meshing engagement with the mutilated gears 31, 28, and 25 it is obvious that the indicating-wheels will be turned until the gears 47, 41, and 39 come opposite the gaps or spaces in said mutilated gears 31, 28, and 25, at which time the counting-wheels will cease to turn, and all of these counting-wheels will indicate zero.

Each slide B of the columns $a\ b\ c\ d\ e\ f\ g\ h$ is locked in its pushed-in position by a slide-dog 52, the latter being hung at 53 on one flange 13ª of the frame-plate 13. The dog has a stud 54, adapted to rest on the top edge of the slide B and to enter a notch $b'$ in said slide, as indicated by the seventh slide B in Fig. 9. The dog remains in locked engagement with the slide as long as the voter remains in the booth, so that the voter cannot operate the same slide in order to repeat his vote. The dogs 52 are raised in rows by the trips 55, the latter being also disposed in horizontal rows and made fast with a rock-shaft 56, a series of which are mounted in the frame-plate 13. The trips 55 in each row lie immediately below the corresponding row of pivoted dogs 52, and said rock-shafts are provided with fingers 57, adapted to engage with pins 58 on the vertical trip-slides 59, one of which is disposed in each column $a$ to $h$, inclusive.

On the front corners of the casing are disposed the vertical door-shafts 60 61, which support or carry the members 62 63 of the booth-doors. These members are provided with short arms 64, attached to the door-shafts, and each door member has a detachable wing 65. The doors 62 63 are equal in height to the casing A, and when the doors are closed the wings 65 extend on curved lines toward each other, and they close around the vertical column or post 66, the latter having a base 67 fastened to the floor in front of the machine. Each wing may be secured to its door by suitable detachable fasteners, such as the pins 68. (See Fig. 2.) The door 62 at the left-hand side of the booth is adapted to be opened by women in entering or leaving the booth, whereas the door 63 at the right-hand side of the structure is opened by men entering or leaving the booth.

The door-shafts 60 61 are provided near their upper ends with the spur-gears 69 70, respectively, (see Figs. 5 and 14 and dotted lines in Fig. 6,) said gears being housed in suitable recesses 71, which are provided in the top 1 and are inclosed below the plates 72, which are suitably fastened to the top. The gears 69 70 have intermeshing engagement with other gears 73 74, which are also housed in the recesses 71 and are fastened to the short counter-shafts 75 76, the upper ends of said counter-shafts being journaled in the top 1 and the plates 72, while the lower ends of the counter-shafts extend into the casing A and are mounted in the bracket-arms 77, the latter being fastened to the front of the casing, as shown by full and dotted lines in Figs. 5 and 6. The counter-shafts 75 76 are provided at their lower ends with the cams 78 79, (see dotted lines in Fig. 6 and full lines in Fig. 5,) and these cams have the active faces formed on the under sides thereof, as shown more clearly in Fig. 5. A horizontal door-actuated shaft 80 is journaled in the upper portion of the casing A between the series of releasing or trip bars 59 and the short vertical shafts 75 76, and this horizontal shaft is provided near its end portions with the forwardly-extending arms 81 82, (see full and dotted lines, respectively, in Figs. 6 and 5,) said arms being provided at their front ends with the roller-shoes 83, the latter arranged to ride against the active faces of the cams 78 79. The horizontal door-actuated shaft is provided with a series of rearwardly-extending arms 84, which project from the shaft 80, so as to have overlapping relation to the vertical releasing or trip bars 59, and these arms 84 are provided with pins 85, arranged to loosely fit in the slots 86 of said trip-bars 59, whereby the pins 58 of said bars will lift the fingers 57 and turn the series of trip rock-shafts 56, so as to throw the trips 55 into engagement with the locking-dogs 52.

To comply with the law in those States which require a special register to indicate the total number of voters, male or female, having voted, I provide the register inclosed in a casing 87, as shown in Figs. 1, 2, 12, and 13.

88 designates a reciprocatory and separable register-operating stem, the same being mounted for vertical movement freely through the top 1 of the machine-casing A and through the register-casing 87. I prefer to make this stem in two parts or sections, which are provided with the abutting flanges 89, adapted to be secured detachably together by means of the screws 90, (see Fig. 12,) thus making provision for removing the upper part of the stem from the lower part thereof when the register 87 is to be detached from the machine-casing A. The upper member of the stem is slidably fitted in and guided by an arm 91, that projects from the front side of the casing, and said upper part of the stem is provided with a pair of pins 92 93, adapted to extend therefrom at right angles one to the other, as shown more clearly in Fig. 13. The pin 92 on the stem 88 is adapted to fit below a pawl-carrier 94, having a pawl 95, adapted to engage with a ratchet 96, which is loosely mounted on a shaft 97, said ratchet 96 forming a part of a female-voters' register, which may be of any suitable construction and is therefore not fully represented by the drawings. The other pin 93 is adapted in another position of the stem 88 to fit beneath a pawl-carrier 98, the latter being loosely mounted on the shaft 97 and disposed on the opposite side of the stem 88 from the pawl-carrier 94. This pawl-carrier 98 sustains a pawl 99, which is adapted to engage with a ratchet-wheel 100, that is loosely fitted on the shaft 97 on the opposite side from the pawl 96, said ratchet 100 forming a part of a male-voters' register, which, like the female-voters' register, may be of any suitable character, so that it is not considered necessary to fully illustrate the same herein. From this description it will be apparent that the spindle 88 must be capable of rocking or turning on a vertical axis in order to bring the pin 92 into operative relation to the pawl-and-ratchet mechanism of the female-voters' register; but normally the stem 88 occupies a reversed position to that shown in Fig. 13, so that the pin 93 of the stem will be operatively connected with the pawl-carrier 98, so as to operate the pawl-and-ratchet mechanism of the male-voters' register. An upward impulse is given to the stem 88 when either of the voting mechanisms, such as the individual push-slides B or the straight-ticket push-slides B' or the push-slides associated with the independent-voting mechanism (shown in Fig. 11) is operated.

To provide for the axial turning of the stem 88 or the shifting thereof to bring the pins 92 93 into operative connection with either of the registers, I employ means which are actuated by the opening and closing movements of the doors. A horizontally-slidable bar 101 is disposed in a transverse position between the cams 78 79 on the short vertical counter-shafts 75 76, said bar 101 extending across the front portion of the machine and suitably supported therein, so as to be capable of a free reciprocatory movement. The end portions of the horizontal slidable bar are enlarged to form the shoes 102, (see Fig. 14,) and these shoes terminate very close to the cams 78 79, so that the rollers 103 104 (indicated by the full and dotted lines in Figs. 5 and 6 and the positions of which are shown in Fig. 14) will ride or bear against said shoes 102. It will be seen that when the door 62 is opened the gears 69 73 will turn the shaft 75 and actuate the cam 78 so as to impel the rod or bar 101 toward the right in Fig. 14; but when the other door 63 is opened by a man entering the booth the gears 70 74 will turn the shaft 76 and the cam 79, so as to make the roller 104 on said cam shove the bar 101 to the left, the bar being thus reciprocated by the opening and closing of the doors when male and female voters enter and leave the booth. This bar is provided with a stud or pin 105, (see Figs. 12 and 14,) which pin is loosely fitted in a slot 106, that is provided in a crank-arm 107, which is made fast to the reciprocatory and shiftable stem 88. It will be seen that when the bar 101 is moved in one direction the pin 105 will turn the crank-arm 107 so as to move the stem 88 on its axis, thus shifting the stem so as to bring one of its pins into an operative position to one register and out of an operative position to the other register.

The slidable bar 101 is constructed so that it will not become broken or operate to break any of the parts associated therewith in case both of the doors 62 63 of the booth are opened simultaneously. To accomplish this end, I make the bar 101 in sections which are slidably fitted in a connecting tube or sleeve 108, the latter serving as a housing for a coiled resistance-spring 109, the end portions of which bear against the adjacent ends of the members comprising the bar 101. The end portions of the members forming said bar 101 are provided with pins 110, that are adapted to have a limited travel in short slots 111, which are provided in said connecting-tube 108. When one of the doors is opened, a member of the bar 101 is forced inward, so as to cause its pin 110 to travel in the slot of the sleeve 108 for a limited distance, thereby compressing the spring 109, the resistance of which causes the tube 108 to actuate the other member of the bar 101 and cause the bar as an entirety to be shifted endwise in one direction. If both of the doors are opened simultaneously, the two members of the bar are forced inward within the limits permitted by the slots 111, and they operate to compress the spring 109, the compression of this spring allowing the members of the bar to have the necessary travel for the doors to be opened the required extent without breaking the parts forming the bar 101, the rollers 103 104, or the cams 78 79.

The lower member of the stem 88 is provided with an enlarged foot 112, the same adapted to rest upon the convex upper face of a horizontal bar 113, which is disposed in the vertical plane of the stem 88 and in the upper front portion of the casing A. (See Fig. 12.) This bar 113 serves to connect a series of swinging arms 114, said series of arms being pivotally supported, as at 115, on the front of the casing A. The arms 114 extend rearwardly beyond the connecting-bar 113, and these arms are adapted to rest upon pins or studs 116, which are provided on a series of vertically-movable slides 117. One of these slides is disposed in operative relation to the series of push-slides in each column of the machine, and each slide lies adjacent to a vertical column of push-slides B B' in close lateral relation thereto and preferably just in rear of the second tier of arbors, (indicated at $19^a$.) Each vertically-movable slide 117 is provided at proper intervals throughout its length with studs or pins 118, and with each stud of the slide 117 is engaged the hook-shaped arm 119 at one end of a slide-operating lever 120, the latter being fastened rigidly to one of the arbors $19^a$. I employ a slide-operating lever 120 in connection with each push-slide B or B' for the six columns of slides $a$ to $f$, inclusive, and for the slides which are employed in the column $g$ and for the slides which are used in connection with the independent voting-column $h$, so that it will be understood that a very large number of these slide-actuating levers 120 are employed. Each lever 120 is approximately triangular in shape. At one corner or angle is the hook-shaped arm 119. At the opposite corner or angle is a similar hook-shaped arm 121, which is adapted to engage with a stud 122 on the push-slide, and at its remaining corner or angle the lever 120 is rigidly secured to one of the arbors $19^a$, which thus, in effect, becomes a rock-shaft, said arbor or rock-shaft $19^n$ turning easily within the sleeves 32 of the individual registers, so as to avoid disturbing the latter. The levers 120 are disposed in horizontal rows on the arbors or rock-shafts $19^a$, so as to lie practically between the horizontal rows of push-slides, and these levers 120 are furthermore disposed in vertical columns, so as to have operative relation to the series of studs or pins 118 on the register-operating slides 117. It will be understood that when one of the push-slides B or B' or the push-slides of the special or independent voting columns is forced inwardly the stud 122 of the slide will operate against the arm 121 of the lever, thereby turning the lever associated with the individual slide and rocking the entire series of levers 120, which are attached to the arbor or shaft $19^a$. These series of levers on the particular shaft or arbor which is operated by the inward movement of a particular push-slide make the arms 119 engage with the studs 118 on the series of register-operating slides 117, thereby raising the latter and the studs 116, which in turn lift the series of arms 114 and the connecting-bar 113, so as to impart an upward movement to the stem 88 and actuate the register mechanism, nor can the inward movement of any other push-slide in the same horizontal row or plane have any effect on the series of vertically-movable register-actuating slides 117, because said slides 117 and the levers 120 are locked in their raised active positions by engagement with the stud 122 on the push-slide which is shoved inward or retracted. When the locking-dog 52 is released from engagement with the notch $b'$ in the push-slide, owing to the fact that the voter in leaving the booth opens the door, so as to raise the trip-bar 59 through the described train of connections, the weight of the lifted register-actuating slides 117, acting against the levers 120, and the pin or stud 122 on the shoved-in push-slide serves to throw the push-slide in a forward direction and to return it to its normal position, thus utilizing the weight or gravity of the lifted slides 117 as the means for returning the push-slides to their normal positions and dispensing with springs or separate devices to accomplish the desired projection of the push-slides after they shall have been used in casting the votes.

The register mechanism 87 is also equipped with a total-vote-counting device, a part of which is shown by Fig. 12, the same having a shaft 123, on which is a wheel 124 and a ratchet 125, said wheel 124 meshing with another register-wheel 126 on a shaft 127. (See Fig. 12.) Loosely mounted on the shaft 123 of the total-counting mechanism is a pawl-carrier 128, having a pawl 129, which engages with the ratchet 125, and beneath this pawl-carrier is operatively arranged a quadrant-shaped finger 130, the latter arranged to always occupy an operative relation to the pawl-carrier 128 in either of the shifted positions of the stem 88. This quadrantal finger 130 is also indicated in Fig. 13, while a third register mechanism is operated in harmony with either of the two register mechanisms.

A straight-ticket-voting slide $B'$ is provided in connection with each column $a$ to $f$, inclusive, and these slides $B'$ are disposed at the heads of the vertical columns of slides B. Each slide $B'$ is similar in construction to the slides B, in that it is provided with a notch $b'$ near its inner end, adapted for engagement with one of the dogs 52, and its outer exposed end is provided with a push-button 16, although this push-button may be omitted from each slide $B'$ because I prefer to employ a separate lever 131 for the actuation of the straight-ticket-voting slide $B'$, one of said levers being employed in connection with each slide $B'$. The levers 131 for the series of six slides $B'$ in the columns $a$ to $f$, inclusive, are mounted in exposed positions at the upper front portion of the casing A, said levers being fulcrumed, as at 132, reference being had to Fig. 9. Each lever is provided at its upper portion with an offstanding shank, to which is connected a pendant 133 by means of the pivot 134, said pendant having a knob 135, the entire pendant being outside of the machine-casing, so as to be within convenient reach of the voter. The lever 131 is furthermore provided with two hook-shaped arms 136 137, which are disposed on opposite sides of the vertical plane of the fulcrum 132, the former of said arms 136 being engaged with a stud 138, which is made fast to the straight-voting push-slide $B'$, whereby a downward pull on the pendant 133 will turn the lever 131 and make its arm 136 push rearwardly on the pin 138, and thereby force the slide $B'$ rearwardly into the casing A, so that the proper dog 52 will engage with the notch $B'$ in said slide. The other arm 139 of each lever 131 is arranged to engage with a stud 140, which is provided on each of a series of vertical slides 141 for the operation of the entire column of individual registers which are associated with the column of push-slides, of which the push-slide $B'$ forms one of a series. Each slide 141 is provided with a series of slots 142, so as to enable the slide 141 to fit loosely to the series of arbors 19, each slide 141 extending the full depth of the tier of arbors 19 and being movable in a vertical direction with relation thereto. The tier of arbors 19 serve to support the series of slides 141, and each slide carries a series of feed-pawls 143, the said pawls being arranged to engage with a vertical column of ratchets 144, which are provided on the sleeves 20 of the individual registers associated with the push-slides, (see Figs. 3 and 9,) and thus turn the said ratchets when the lever 131 raises the slide 141. It follows that the operation of the lever 131 by a voter will serve to indicate that a straight vote has been cast for one of the political parties. The pushing in of the slide $B'$ will actuate the proper registers in case 87 through its associated lever 120. Of course the inward movement of the straight-ticket slide $B'$ brings into play the dog 52, which serves to lock the slide in its inmost position, thus preventing the voter from repeating his vote by again operating the slide $B'$. When the voter leaves the booth, the dog is released by the action of the tripping mechanism under control of one of the booth-doors, and the weight of the bars 117 returns the slide $B'$ to its projected position.

To prevent a voter operating any straight-ticket slide or any of the individual-candidate slides, I provide the slides $B'$ with two notches 147 and $147^a$. (See Fig. 12.) A horizontal shaft 145, disposed in the same vertical plane as shafts $19^a$, has rigidly secured to it a series of pawls 146, one over each slide $B'$. Each slide 117 carries a pin 148, disposed under a tailpiece of the pawl 146 of that column.

When the slides 117 are raised by the pushing in of the slides B or B', the front end of the pawls will be tipped downward in one of the notches of the slides B'. If a slide B' is pushed in, its pawl 146 will enter the notch 147. The pawls 146 of the other slides B' will enter the notches 147ª, thus locking out those slides. Thus when a slide B is operated, all of the slides B' are locked out.

In addition to the series locking mechanism for the straight-ticket slides just described I employ a multiple locking mechanism adapted to be operated by the inward movement of either straight-ticket slide B' for the purpose of preventing either of the individual push-slides B from operation simultaneous with or subsequent to one of the straight-ticket slides B' by the voter temporarily occupying the booth.

A column of horizontal locking-shafts 150 is disposed within the machine-casing A, said column of shafts lying between the series of rock-shafts 56 and the tier of arbors or rock-shafts 19ª. The locking-shafts 150 correspond in number to the number of push-slides in each column, and said locking-shafts are journaled in suitable bearings provided in the machine. These locking-shafts extend across all the columns $a$ to $h$, inclusive, and the locking-shafts are provided with a series of locking-wheels 151, which are shown more clearly by Fig. 6. These locking-wheels are provided with teeth disposed at regular intervals to provide spaces adapted to receive the locking-studs 152, which are provided on the locking-bars 153; but normally these locking-bars 153 are lowered, so that ample clearance is provided between the studs 152 and the path of the teeth on the locking-wheels 151. One series of locking-wheels 151 and one of the studded locking-bars 153 are provided for each column of push-slides B B' and for the column of push-slides in the independent-voters' column $h$. Each locking-slide 153 is adapted to be raised by operative connections with one of the straight-ticket slides B', and this train of connections is formed by a rock-shaft 154, a series of fingers 155, and a series of push-studs 156, (see Fig. 16,) said rock-shaft 154 being equipped with a series of lifting-arms 157, which engage with studs 158 on the locking-slides 153. The rock-shaft 154 is disposed above and in the vertical plane of the column of locking-shafts 150, and the lifting-arms 157 of this rock-shaft are curved, so as to fit snugly beneath and remain in engagement with the studs 158 on the locking-slides. The studs 156 on the straight-ticket slides B' are placed so that they will normally be free from engagement with the fingers 155, the latter being disposed in the path of said studs 156. On the inward movement of either push-slide B' the stud 156 will engage with one finger 155, and this finger will turn the rock-shaft 154, so as to make the series of lifting-arms 157 raise the entire series of locking-slides 153 so as to bring the studs 152 thereof into engagement with all the locking-wheels 151 associated with the columns $a$ to $f$, inclusive, and $h$, whereby the inward movement of one straight-ticket slide will operate the multiple locking mechanism, so as to prevent all of the individual push-slides in the columns $a$ to $f$, inclusive, and $h$ from being pushed in when the voter occupies the booth. On the return of the push-slide B' to its projected position the pin 156 of that slide will be withdrawn from the finger 155, and the weight of the series of locking-bars 153 will return them to their normal positions, thereby withdrawing the studs 152 from engagement with the locking-wheels 151.

The mechanism operated by the door 62 to lock all the voting-slides except those which partially-qualified voters, such as women, are entitled to operate will now be explained. (See Figs. 3, 6, and 14.)

It will be noted that the studded bars 153 of the multiple locking mechanism are disposed on one side of the column of locking-shafts 150, and on the opposite side of this column of locking-shafts I provide the series of arbitrary locking-slides 159, one of which is provided for each of the series of locking-wheels 151 and for each of the voters' column of slides. Each arbitrary locking-slide 159 is provided with a series of apertures 160, in which may be inserted the removable studs 161, the latter adapted to enter the spaces in the locking-wheels 151. It is evident that any desired number of these insertible pins 161 may be connected to each of the arbitrary locking-slides 159 in order to engage with any desired number of the locking-wheels 151, thus preventing the locking-wheels 151 of certain candidates' push-slides B from being operated when the female voter enters the booth; but it is obvious that the omission of this stud 161 from certain places on certain slides will allow the corresponding number of locking-wheels 151 to remain free, whereby the woman voter can vote for that particular candidate or candidates. The arbitrary locking-slides 159 are provided with lifting-studs 162, (indicated by dotted lines in Fig. 6,) and with these lifting-studs 162 are engaged the lifting-fingers 163 on the series of rock-shafts 164. These rock-shafts are disposed in a horizontal row below the shaft 80 and the slide 101, one of said rock-shafts 164 being provided for one column of voters' slides in each of the columns $a$, $b$, $c$, $d$, $e$, $f$, and $h$. The horizontal rock-shafts 164 are disposed to extend from front to rear of the machine and at right angles to the other columns of rock-shafts and arbors, and these shafts 164 are provided with the upstanding arms 165, which are disposed in the path of rearwardly-extending tappets 166. (See Fig. 14.) One of the tappets 166 is provided on the door-operated slide 101 in operative relation to one arm 165 on one rock-shaft 164, and thus a series of these tappets 166 are provided in spaced order on the door-operated slide 101, whereby the movement of the slide 101 toward the right in Fig. 14 by the opening movement of the women's door 62 of the booth will make the tappets 166 ride against the series of arms 165, so as to simultaneously turn all of the rock-shafts 164, and these rock-shafts will operate the lifting-arms 163, which, acting on the studs 162, will raise the series of arbitrary locking-bars 159, so as to move the insertible pins 161 into engagement with the proper number of locking-wheels 151, so as to lock the individual candidates' push-slides B except those push-slides of the candidates for whom the women are entitled to vote.

I will now proceed to describe the cumulative or multiple voting mechanism, which may be used on certain portions of the machine to allow each voter to register more than one vote—that is, to enable the voter to split or divide his vote in order to vote for two or three candidates in the same or in different political parties for the same office. Certain States permit each party to nominate two or three candidates for each office, and the laws of the States allow the split voting to be done—as, for instance, the State of Kansas allows the voters to divide their votes for such offices as justices of the peace and constables.

The locking-shafts 150, which extend transversely across the middle portion of the machine, are provided with a number of columns of locking-sectors 167, which are made fast with said shafts 150 and are provided with two or more ratchet-teeth. These locking-sectors are disposed in vertical columns corresponding in number to the slides B B' and to the slides of the independent-voting mechanism hereinafter described, whereby the locking-sectors are arranged in horizontal rows below the individual slides B. Each locking-sector is provided with a stud 168, which is adapted to enter one or the other of the notches $b^2$ $b^3$, which are provided in the lower edge of each slide B B', reference being had more particularly to Figs. 9 and 11. The locking-sectors are made fast with the locking-shafts 150, and each sector is adapted to be turned one, two, or more teeth by the action of a feed-pawl 169, which is mounted on each slide B B', so as to move therewith. It will be understood that each slide in each column is equipped with one feed-pawl, the same being pivoted to the slide, as indicated at 170, and this pawl is provided with an extension 171, arranged to play between the stop-pins 172, whereby the pawl is free to turn a limited distance on the push-slide, so that it cannot fly out of operative relation to the locking-sector. Each feed-pawl 169 is mounted on the push-slide, so as to always occupy an operative relation to one locking-sector; but normally the pawl is held free from the teeth of the locking-sector by its rearward extension 171 engaging with one of the stop-pins 172, said pawl occupying the disengaged position relative to the locking-sector when the push-slide is in its forward or projected position. The inward movement of one push-slide for a certain candidate in one row operates to bring the proper feed-pawl 169 into engagement with one locking-sector, and the sector is turned the distance of one tooth by such inward movement of the feed-pawl, so as to impart one step to the rotation of the locking-shaft 150, which has operative relation to the locking-sectors and feed-pawls of all the push-slides in that horizontal row. The extent or degree of turning movement which may be given to the locking-shafts 150 by the successive operation of two or more push-slides in one horizontal row when the voter splits or divides his vote for two or more candidates in different political parties for the same office is determined by the adjustment of a detent mechanism which forms a part of the cumulative or multiple voting mechanism, such detent mechanism being represented more clearly by Figs. 3 and 5.

To enable others to understand the detent or controlling devices for the cumulative or multiple voting mechanism, I will take an example of one adjustment by which a voter can vote for three candidates in the same or in different political parties for the same office, and we will assume that the names of these three candidates are in adjacent horizontal rows, so that the locking-shafts for the three candidates can conveniently be designated as $150^a$, $150^b$, and $150^c$ in Fig. 5. The left-hand end of the series of shafts 150, of which the shafts $150^a$, $150^b$, and $150^c$ form three shafts of said series, are extended through the partition 2, so as to terminate within the compartment 3. On the shaft $150^a$ is secured a gear-pinion 173, which has intermeshing engagement with a gear-pinion 174, that is idly mounted on a stub-shaft 175, said intermediate gear-pinion 174 having a ratchet 176 made fast therewith. This intermediate gear 174 has intermeshing engagement with another gear 177, which is made fast with the projecting end of the locking-shaft $150^b$, and the gear 177 has intermeshing relation to another gear 178, which is provided on another stub-shaft 179. Finally, this gear 178 meshes with another gear 180, which is made fast to the projecting end of the locking-shaft $150^c$. The intermediate gears 174 and 178 do not intermesh one with the other, nor do the train of gears 173, 177, and 180 intermesh one with the other; but they have engagement only through the intermediate idle gears 174 178. The stub-shafts 175 and 179 for the intermediate idle gears are properly mounted on or attached to the partition 2. One of the locking-shafts 150—as, for example, the shaft 150$^b$—is provided with a stop-arm 181, the same being made fast to the shaft, so as to turn therewith. This stop-arm is adapted to traverse a plate 182, which is made fast to the partition 2, and this plate is provided with a series of apertures 183, in either of which may be inserted an adjustable stop-pin 184. If the cumulative-voting mechanism is adjusted to allow the voter to cast two votes for different candidates for the same office, the stop-pin 184 is inserted in the second hole of the plate 182, and when three votes are allowed to the voter the said stop-pin is inserted in the third hole of the plate, thereby holding the stop and allowing the ratchet-locking sectors to fall back one tooth for each vote cast by the voter then occupying the booth.

The detent mechanism, which includes the ratchet 176, is adapted to be released when the voter leaves the booth through connections operated by the opening of the door, and to this end I provide the door-operated rock-shaft 80 with another arm 185, the same being provided on that part of the rock-shaft 80 which extends through the partition 2, so that the arm 185 lies in the compartment 3 of the casing. This arm 185 is provided with a stud 186, fitting in a slot 187, which is provided in a trip-rod 188, the said rod having one or more pins 189, adapted to engage with a locking-pawl 190, said pawl being loosely mounted on one of the locking-shafts—as, for instance, the shaft 150$^a$—and provided with a tooth 191, which engages with the ratchet 176.

When the cumulative-voting mechanism is provided in certain parts of the machine, I employ means for holding the locking-dogs 52 in positions where they will not engage with the slides of those candidates for whom the voters are likely to split their votes. To these ends the trip-shafts 56 are extended through the partition 2, as shown by Fig. 5, and on these trip-shafts are rigidly secured the adjusting-arms 192, each arm having a finger-piece 193 and a longitudinal slot 194. In the slot is slidably fitted a locking-piece 195, having a finger-piece 196, by which the locking-piece may be drawn within the limits of the arm 192. This locking-piece may, however, be projected beyond the arm, so as to engage with a pin 197, attached to the partition 2. When certain candidates are to be voted for by the cumulative or multiple voting mechanism, the arms 192 are depressed to the position shown by the fourth arm in the series in Fig. 5 and the locking-piece 195 is adjusted into engagement with the stud or pin 197. The depression of the arm 192 turns the rock or trip shaft 56, and thereby raises the trips 55 into engagement with the locking-dogs 52 and withdraws the fingers 57 from the studs 58 on the releasing-bar 59.

Assuming that the voters are allowed to cast three votes for the three candidates of one party for one office or for either the candidates of three parties for the same office, three of the arms 192 are depressed and locked by the pieces 195 in order to raise the dogs 52 out of positions for engagement with the push-slides B for the individual candidates. The proper gears 173, 177, and 180 having been applied to the shafts 150$^a$ 150$^b$ 150$^c$ and the gears 174 and 178 fitted to the stub-shafts 175 179, the pin 184 is placed in the third hole of the plate 182, and the machine is ready for operation.

Each voter is entitled in voting for one office to push in the slides B three times, and he may vote for the three separate candidates of one party or for the candidates of different parties. When one slide B is pushed in, the pawl 169 engages with one sector 167 and turns the latter one tooth and also gives a partial turn to one locking-shaft, and this operation turns, say, the shaft 150$^a$ a step in its rotation, which is communicated to the gear 173, and by the described train of gears 174, 177, 178, and 180 the motion is transmitted to the shafts 150$^b$ and 150$^c$. At the same time the stop-arm 181 is moved opposite to the first hole in the stop-plate, and thus moved one step toward the stop-pin 184, and the turning of the three shafts 150$^a$ 150$^b$ 150$^c$ turns all the sectors 167 on the three shafts, so as to move the studs 168 one step closer to the notches $b'$ or $b^2$ in the three rows of slides devoted to the candidates allowed in cumulative voting. The three shafts are held from backward rotation by the pawl 190 and the ratchet 176. The voter still has two votes remaining, and he may operate either of the two slides in the same row having the shaft 150$^a$ or either of the slides in either row having the shafts 150$^b$ or 150$^c$. Assuming that a slide in the row having the shaft 150$^b$ is operated, the locking-sector 167 is forced around one tooth by the pawl 169, and the gear 177 operates on the gears 174 and 178 so as to turn the shafts 150$^a$ and 150$^c$ in the proper direction through the gears 174 and 178, whereby all the shafts 150$^a$ 150$^b$ 150$^c$ are operated so as to again advance all the sectors 167 and move the pins 168 still closer to the notched slides in the three rows, also moving the arm 181 one step closer to the pin 181. Now when the final vote is cast the shafts 150$^a$, 150$^b$, and 150$^c$ are all turned so as to bring the pins 168 of the three rows of sectors into the notches $b'$ or $b^2$ of the slides B, while the arm 181 engages with the stop-pin 184, thus preventing further turning of the locking-shafts. The pins 168 of the locking-sectors enter the notches $b^3$ of the slides B, which are pushed in by the voter; but the slides in the same row or rows that are not pushed in are also locked by the pins 168 on the other sectors of the shafts 150$^a$ 150$^b$ 150$^c$ entering the notches $b^2$ of the slides, thus preventing the voter from "repeating." Of course the individual registers are operated when the separate slides B are pushed in and the rods 117 are raised to operate the public register. When the voter leaves the booth, the door actuates the shaft 80, so as to lift the slide or bar 188 to raise the pawl 190 and free the ratchet 176, whereby the slides B, which are pushed in, may be restored by the register-rods 117 to the projected positions, the shafts $150^a$, $150^b$, and $150^c$ and the sectors 167 thereon being turned back, so that the pin 181 will be withdrawn from the pin 184, and thereby again restore the culmulative-voting mechanism to an operative condition. This mechanism may also be adjusted to allow only two candidates to be voted for by each voter, in which case the pin 184 is placed in the second hole of the plate 182, and the gears 178 and 180 are omitted. Of course the mechanism may be adjusted to allow more than two or three candidates to be voted for by each voter, and this mechanism may be duplicated as many times as there are offices and candidates.

I will now proceed to describe the voting devices which are employed in connection with the panels 10 of the special propositions or amendments column $g$, such voting mechanism being indicated more clearly by Fig. 10. Each panel 10 is equipped with two voters' push-slides, adapted to indicate, respectively, an "aye" vote at $B^2$ and a "nay" vote at $B^3$, a pair of these push-slides being used in connection with each short panel 10, so that a series of paired slides are employed in the column $g$. Each push-slide for the "aye" and "nay" vote is similar in construction to the push-slide for the individual vote heretofore described, in that the slide is provided with a push-button 16 and with a feed-pawl 35, adapted to operate the ratchet 34 for an individual-register mechanism associated with the slide, said register mechanism having its parts supported on the arbors or shafts 19 $19^a$. These push-slides $B^2$ $B^3$ do not have associated therewith the locking-dogs 52 nor the levers 120, which actuate the register-rods 117, nor the cumulative-voting mechanism. I am therefore able to provide each push-slide with two notches $b^4$ $b^5$ in the top edge thereof, and each slide is also provided with a detent-actuating pin 199. The detent-levers 201 are loosely mounted on the locking-shafts 150, and these levers are connected operatively together by a link 202, whereby the detent-levers are adapted for simultaneous operation. The lever 200 has one edge thereof disposed in the path of the stud 199 on the push-slide $B^2$, and this lever is provided with a pin 203, which is arranged to fit in one or the other of the notches $b^4$ $b^5$ in said slide $B^2$. Furthermore, the lever 200 is provided with a shoulder 204, adapted for engagement with the pin 205 of a locking-dog 206, the latter being pivoted to a stationary bar 207, which is provided in the casing. The lever 201 is disposed in operative relation to the other push-slide $B^3$, and said lever is provided at one corner with a locking-pin 208, which is adapted for engagement with either of the notches $b^4$ $b^5$ in the slide $B^3$. The locking-dog 206 is adapted to normally rest upon a pin 209, which is provided on a trip-bar 210, that has operative connection with the door-operated shaft 80 through an arm 211, which is provided with a pin 212, arranged to fit in the slot 213 of the trip-bar 210. The slides $B^2$ $B^3$ are normally projected beyond the casing in a similar way to the slides B B', and when both of the slides $B^2$ $B^3$ are projected and the stud 205 is free from the lever 200 the weight of the link 202 turns the levers 200 201 so that the studs 203 208 will be free from engagement with the notches in the slides. When one of the slides—as, for example, the slide $B^2$—is pushed in, the pin 199 rides against the lever 200 and turns the latter so as to actuate the link 202 and the other lever 201, whereby the lever 200 is arranged for its stud 203 to enter the notch $b^4$ of the pushed-in slide $B^2$, whereas the stud 208 of the other lever 201 is adapted to enter the notch $b^5$ of the other slide $B^3$, which is not pushed in. Both of the slides are thus locked, so that the voter cannot operate both the "aye" and "nay" slides, and said slides are held in their proper positions by the stud 205 engaging with the shoulder 204 of said lever 200. When the voter leaves the booth and the shaft 80 is rocked by the opening of the booth-door, the arm 211 raises the trip-slide 210, thus withdrawing the stud 205 from engagement with the lever 200, whereby the locking mechanism is disengaged from the slides $B^2$ $B^3$, and said slides may be restored to their normal condition.

I will now proceed to describe the independent-voting mechanism by which each voter is able to cast a vote for any candidate of his own selection outside of the nominees or candidates of either or all the parties, and this independent-voting mechanism is represented more clearly by Figs. 3 and 11. Said voting mechanism employs a number of slides $B^4$, arranged in a vertical column similar to the slides in the columns $a$ to $f$, inclusive, and these slides correspond in number and horizontal arrangement to the slides in the said columns. With each slide $B^4$ is associated a locking-dog 52 and the trip or releasing mechanism therefor, the individual-register mechanism, which is adapted for operation by feed-pawl on the slide similar to the slides B B', the lever 120, having operative connection with the public-register operating-slide 117, the locking-shaft 150, having the multiple locking-rod 153 and the arbitrary locking-rod 159, adapted for engagement with a column of locking-wheels similar to the wheels 151, and, finally, I may employ the cumulative-voting mechanism, which employs the locking-sectors 167, adapted to engage with the notches in the lower edge of the push-slides. Each push-slide $B^4$ is provided with the push-button 16, and across the series of push-slides extend the end portions of the arbors 19 and the rock-shafts $19^a$. On each arbor 19, which lies adjacent to each independent-voting push-slide $B^4$, is fitted a take-up spool 214, the same lying immediately in rear of one of the slots 12, which is provided in the front panel 11, devoted to the column $h$. This take-up spool is provided with a head 215, having pins or studs, which are indicated by dotted lines in Fig. 3, said pins or studs adapted to fit in sockets which are provided in one face of a ratchet 216. This ratchet is provided with a sleeve 217, that loosely fits on the arbor 19 and which extends loosely through the take-up spool 214. It will be seen that the take-up spool and the sleeve are locked together by the pins on the head 215 of the spool fitting in the sockets provided in the ratchet 216 of the sleeve, and this spool is prevented from endwise displacement on the arbor 19 by means of a suitable pin or key 218. When the pin 218 is withdrawn, the take-up spool 215 may be slipped from the sleeve without disturbing the ratchet 216, thus allowing the withdrawal of a filled take-up spool from the arbor. The take-up spool is adapted to be automatically turned immediately following the pushing in of the proper voter's slide $B^4$, and I will now proceed to describe the preferred means by which this operation can be effected.

On each arbor 19 is loosely mounted a pawl-carrier 219, to which is pivoted a pawl 220, the latter adapted to engage with the ratchet 216. The pawl and its carrier are positively moved when the slide is pushed in by the movement of a lever 221, the latter being also loosely mounted on the arbor 19 or on the pawl-carrier, and said lever is connected with the pawl by means of a link 222. The lever 221 has its upper free end disposed in the path of a link 223, which is pivoted to the slide $B^4$ and is arranged to extend loosely through a slot in the panel 11. The outer end of the link 223 is pivoted to a crank-arm 224, which is provided on the pivotal rod 225 of a drop leaf or cover 226, said pivotal rod 225 being loosely mounted in bearings 227, that are attached to the front panel 11 on opposite sides of the slot 12 therein. The inward movement of the push-slide $B^4$ operates the link 223, so as to turn the drop-leaf 226 on its pivot, thereby raising said drop-leaf to the position shown in connection with the third slide in Fig. 11. The described movement of the slide and the link turns the lever 221, which pulls the pawl 220 into engagement with the ratchet 216, thereby turning the take-up spool 214 a distance sufficient to coil a length or section of a tape or band on said spool. It will be noted that the slide $B^4$ must be pushed inwardly in order to raise the drop-leaf 226 to expose the tape or band.

In connection with each take-up spool I employ a feed-spool 228, the same being loosely fitted on one arbor or rock-shaft $19^a$ immediately in rear of its companion take-up spool. This feed-spool is adapted to contain a supply of paper band, tape, or ribbon, and said spool is held from rotating too freely on the shaft or arbor by means of a brake-spring 229, the latter impinging one head of the feed-spool and held from displacement on the shaft or arbor $19^a$ by means of a disk 230 or its equivalent.

Immediately in rear of each slot 12 in the panel 11 is a plate 231, across the face of which may be drawn the tape, band, or ribbon. A narrow slot or throat 232 is provided between this plate 231 and one edge of the slot 12 in the front panel 11. (See Fig. 3.)

In Fig. 15 of the drawings I have illustrated a modified construction of the means for locking the individual push-slides B. This construction may be employed when the cumulative-voting mechanism is not embodied in the machine, and this locking mechanism is also adapted to be used as a substitute for the locking-dogs 52 and their associated parts. Each push-slide B is intended to be provided with the notches $b^4$ $b^5$, similar to the construction employed in the "aye" and "nay" voting mechanism shown by Fig. 10. The locking-dogs 233 are disposed in the path of the studs 234 on the push-slides, and these dogs are equipped with the pins 235, adapted to enter either of the notches $b^4$ or $b^5$. Each dog is also provided with a locking-shoulder 236, which is engaged by a pin 237 on the releasing-trip 238, the latter being pivoted at 239 to a stationary bar 240. The releasing-rod 59 has its pins or studs 58 engaged with the trip-arms 238. It is evident that when either slide B is pushed inward the pin 234 acts against the dog 233 and moves its stud 235 into engagement with the notch $b^4$, thus locking the pushed-in slide. At the same time all the other dogs on the same shaft are turned so that the pins 235 will enter the notches $b^5$ of those slides which are not pushed in. When the voter leaves the booth, the trip-rod 59 is raised by the opening of the door, so that the studs 58 will lift the releasing-arms 238, thus withdrawing the studs 237 from engagement with the shoulders 236 and from engagement with the dogs 233, whereby the push-slide may be projected to its operative position.

Recurring to the public-register mechanism 87, I desire to state that it is my preference to provide said registry mechanism with time-clocks the positions of which are indicated at 240 in Fig. 12. One time-clock may be equipped with devices by which the machine may be locked from further operation at certain hours—as, for example, a depending stem 241 may be provided with a cross-bar 242, having a foot-piece 243 engaging with a projection 244 on the vertically-movable bar 153 of the multiple locking mechanism. At the proper time the stem 241 and the foot-piece 243 are raised so that the bar 153 will be lifted to a position where its studs 152 will engage with the locking-wheels 151, thus preventing the machine from being operated by voters during the period that the time-clock maintains the bars 153 in their raised positions.

The machine comprised within the casing A is adapted to be housed within the chambered base C when it is not desired to use the apparatus. This base, or as it may be termed, the "stand," is provided with a chamber C', the dimensions of which are sufficient to easily receive the entire machine A within the same. On the under side of the machine-casing A is journaled a pair of shafts 245 246, said shafts being capable of movement in a vertical direction with the machine A. Said shafts are provided at their ends with the gear-pinions 247, which are adapted to engage with racks 248, which are provided at the end portions of said chambered base or stand C. Between one pair of pinions at one end of the parallel shafts is disposed a vertical screw or worm shaft 249, which is mounted within one end portion of the base or stand and is arranged to have intermeshing engagement with one pair of said pinions 247. This vertical shaft 249 is adapted to be operated by a crank or any other suitable means, so that the pinions 247 may be rotated and caused to travel on the racks 248, thus raising or lowering the machine A within the stand or base, according to the direction in which the shaft 249 is rotated.

Previous to lowering the machine A the doors of the booth should be removed from the casing, thereby stripping the machine-casing of its outside exposed parts and allowing it to be easily folded within the base or stand.

250 designates braces which are provided with eyes 251 252, the latter being threaded internally. Two of these braces are provided, one at each side of the machine, as shown by Fig. 1, and said braces are connected to the machine by means of the bolts 253 254. The bolts 253 are smooth, so that the eyes 251 of the braces may slide easily thereon; but the other bolts 254 are threaded, and they are screwed into the eyes 252. The bolts are attached to the base or stand C in any suitable way, and when the braces are unfolded the bolts 252 may be rotated in order to raise or lower the braces, thus making provision for leveling the base or stand C and the machine A, which is mounted thereon. The braces 250 may be folded alongside of the base or stand when the machine is not in use. The machine A when lowered into the base or stand is effectually protected from the weather and from accumulations of dust and dirt. The base or stand thus forms an integral part of the voting apparatus, and it also serves as an inclosure for the machine A to prevent the latter from being injured during storage or transportation.

Although I have described that the doors may be removed preliminary to folding the machine within the base, it is evident that these doors may be made of pliable material and constructed to overlap each other, so that they may be disposed compactly relative to the machine, whereby the doors may be folded with the machine inside of the base.

As represented by Figs. 3 and 4, the back of the casing is provided with a door A³ of large area, said door adapted to be opened for the purpose of permitting access to be obtained to the interior mechanism of the machine, whereby the operator may change the shiftable pins 161 in the vertically-movable bars 159 of the arbitrary locking mechanism.

In Figs. 19 and 20 of the drawings I have shown one embodiment of means by which the multiple locking mechanism may be brought automatically into service at any predetermined hour. It is customary to open and close the polling-stations at fixed hours, and the mechanism about to be described enables the machine to be locked against use after any certain hour—say at six o'clock or seven o'clock p. m.—or at any given hour of the twenty-four.

The time-clock 240 is equipped with a dial-plate 255, which is provided with a dial having numerals from "1" to "24" inscribed thereon to correspond to the hours of the day and night, as shown by Fig. 19, and through this dial passes the outer end of an arbor 256, on which is mounted a pointer or index 257, the latter adapted to traverse the dial. This arbor is provided with any suitable means for adjusting it by hand—as, for example, by the thumbnut 258, which serves to also hold the index 257—and the arbor is furthermore provided with a ratchet 259, with which engages a pawl 260, as shown by Fig. 20, whereby the arbor is prevented from turning in a backward direction.

A pin or lug 261 is made fast with the arbor at a point between the ratchet 259 and the clutch-wheel 262, the latter being mounted loosely on the arbor 256 and having a hub 263, in which is formed a notch 264.

The rod 241, which is shown by Fig. 12 as extending in an upward direction toward the time-clock, is provided with the pins or studs 265, and on the upper extremity of said rod is arranged a washer 266, which is held against sliding displacement in an upward direction by a pin or stud 267. A strong lifting-spring 268 is fitted loosely on the upper portion of the rod 241, so that its upper end may bear against the washer 266, while its lower portion is seated upon a cross-bar 269 or any other suitable part of the machine-frame. The tendency of the spring 268 is to lift the rod 241, and thereby raise the bars 153, so as to lock the machine against service; but this tendency is arrested by a locking device which is embodied in the form of a lever 270. One end of said lever is fulcrumed, as at 271, to a part of the machine, while the other end thereof is formed with a segmental edge having a series of teeth constituting a gear-segment 272, the latter having intermeshing engagement with a gear-pinion 273, which is made fast to or integral with a locking-disk 274. The combined pinion and disk is mounted on a shaft 275, disposed parallel to the arbor 256, and the disk 274 is provided with a notch 276, with which is adapted to engage the finger 277 of a spring 278, the latter being arranged to engage with a hub portion of the shiftable clutch-wheel 262. The spring 278 is attached at one end to the frame of a time-clock, as at 279 in Fig. 19, and this spring is interposed between the frame of the clock 240 and the hub of the shiftable clutch-wheel, the energy of the spring being exerted on said clutch-wheel in order to force the hub 263 thereof normally against the pin or stud 261 of the setting-arbor 256. The hub of this clutch-wheel is thus adapted to ride against the stationary pin 261, and the spring is held under tension, so that its finger 277 will normally engage with the notch 276 of the locking-wheel 274, thus preventing the locking-lever 270 from moving, and thereby holding the vertical rod 241 against movement in an upward direction under the impulse of the spring 268, said lever 270 being disposed between the pair of pins 265 and normally engaging with the lower pin of the pair, as also shown by Fig. 18.

The clutch-wheel 262 is normally driven by a time-train which may be propelled by any suitable form of clock mechanism or motor; but, as shown by Figs. 19 and 20, a part of the time-train is indicated as consisting of the pinion 280, which meshes with the clutch-wheel 262 and is on the same shaft with a gear 281, which in turn meshes with a pinion 282 on a shaft 283, the latter adapted to be driven by a spring or other form of motor or by the time-train of a clock. The gears forming the train herein described are so proportioned that the pinion 282 will rotate twenty-four times to every single rotation of the clutch-gear 262, the latter being loosely and shiftably mounted on the setting-arbor 256.

It is evident that the thumb-piece 258 may be adjusted to turn the arbor 256, and thereby move the pointer 257 to any desired position with relation to the dial, and at the same time the pin or stud 261 will be given a predetermined position opposite to the notched hub 263 of the shiftable clutch-gear. The spring 278 will engage with the disk 274 and the lever 270 will be locked, so that the rod 241 cannot be raised by the spring 268. During this period the wheel 262 is slowly propelled by the time-train, so that its notched hub 263 will have movement relative to the stud 261 on the setting-arbor, and at the predetermined hour this wheel 262 and its hub will assume a position wherein the notch 264 will come opposite to the stud 261. At this time—say at six or seven o'clock p. m.—the clutch-wheel 262 will be forced by the spring 278 toward the right in Fig. 20, thus making the pin 261 enter the notch 264 and allowing the finger 277 to clear the notch in the disk 274. The lever 270 is thus released and the spring 268 becomes effective in raising the rod 241, which in turn elevates the locking-bars 153, so as to move the pins 152 into engagement with the locking-wheels 151.

Having thus described my invention, I claim as new and desire to secure by Letters Patent—

1. A voting-machine having individual-voting slides each having a locking device and an individual register, a series of straight-ticket-voting devices each having a locking device, a total-register mechanism, vertical register-slides, levers between the individual-voting slides and said register-slides to actuate the latter, a register-stem, means actuated by the register-slides and by either of the straight-ticket devices to move the register-stem, individual-register-actuating bars controllable by the straight-ticket devices to actuate any one series of individual registers, and means for releasing the voting devices.

2. A voting-machine having individual-voting slides, each associated with a locking device and with an individual register, straight-ticket slides each associated with a locking device, a straight-ticket-voting lever operatively related to each straight-ticket slide, a register-actuating bar controllable by each straight-ticket lever and operatively connected to the individual registers in one column of individual-voting slides, a total-register mechanism, a register-stem, a series of vertical register-slides controllable by the columns of individual-voting slides, means actuated by either of the straight-ticket levers and the vertical register-slides to impart movement to the stem of said total-register mechanism, trip devices operatively related to the locking devices for the individual and straight ticket slides, and booth-actuated mechanism to shift the trip devices and release the locking devices from the voting-slides.

3. In a voting-machine, the combination with a series of voting devices disposed in columns, and a multiple register mechanism, of a register-actuating stem, a series of arms having a connecting-bar arranged to actuate said stem, a lever controlled by each voting device, and a series of reciprocating register-slides each having operative relation to one of said arms and to a series of voting-device-actuated levers.

4. In a voting-machine, an arbitrary locking device for voting-slides, comprising a series of shafts each having toothed wheels, reciprocating bars provided with removable pins adapted for engagement with said toothed wheels, and booth-actuated devices for reciprocating said bars, combined with a plurality of voting devices, and a train of operative connections between the voting devices and the series of shafts.

5. A voting-machine having two doors adapted to be opened by voters of different sexes, a plurality of voting devices, means for locking the devices when operated, an arbitrary locking mechanism including toothed wheels and bars having pins which are shiftable to restrain certain wheels and voting devices from actuation and normally occupying an inactive relation to said toothed wheels, means actuated by one of the booth-doors to automatically bring the locking-pins in operative relation to certain wheels and voting devices of the series, and trip devices controlled by either of the booth-doors to release the voting devices from restraint by the locking devices.

6. A voting-machine having individual-voting devices arranged in columns and rows, register devices actuated thereby, individual locking devices for the voting devices, another column of voting-slides disposed in pairs and with each slide of each pair provided with spaced notches, a pair of connected levers disposed adjacent to each pair of notched slides to have interlocking engagement therewith, means to shift the two levers on the inward movement of either slide of the pair, a locking-dog adjacent to one lever of each pair, and booth-actuated tripping devices to release the locking devices and the locking-dogs.

7. A voting-machine having columns of push-slides, locking-dogs therefor, individual registers associated with the slides, a multiple register, vertically-movable slides each connected with a series of push-slides in one column and arranged to actuate the multiple register, a pair of feed and take-up spools adjacent to each slide in one column of slides, a ratchet on each take-up spool, a shutter adjacent to each slide in one of said columns, and levers arranged to be individually shifted by slides in one column and each linked to one of the shutters and carrying a pawl which engages with the ratchet of one of the take-up spools of the series.

8. A voting-machine having a plurality of slides, and a cumulative voting mechanism comprising a series of shafts geared together for simultaneous rotation, sectors on said shafts, means carried by the slides and arranged to turn the sectors with a step-by-step motion, means for limiting the axial movement of the shafts, and means for locking the sectors and the slides against continued movement after the slides shall have been actuated a limited number of times.

9. A voting-machine having a group of voting-slides and a cumulative-voting mechanism, the latter comprising a series of sectors arranged to have interlocking engagement individually with the slides, means carried by the slides to turn the sectors with a step-by-step movement, means connecting the sectors in series and simultaneously actuating the same when either slide is operated, and a detent mechanism for collectively controlling the movement of the group of sectors within a predetermined limit.

10. A voting-machine having columns of push-slides each associated with a register mechanism and a locking mechanism, a cumulative-voting mechanism having a series of locking-sectors arranged to be turned into locking engagement with a series of slides, and said locking-sectors limited in their movement by suitable detent devices, mechanism for holding certain slide-locking devices out of service, and booth-actuated trip devices for releasing the push-slides from restraint by the locking-sectors of the cumulative-voting mechanism.

11. A voting-machine having voting devices, registers actuated thereby, individual locking-dogs for said voting devices, trip-shafts having fingers normally free from engagement with the dogs, a group of vertical trip-slides operatively related to the rock-shafts to simultaneously turn the same, and a booth-actuated shaft connected with the group of said trip-slides.

12. A voting-machine having columns of individual slides each associated with a register mechanism and provided with a notch, a separate locking-dog arranged to engage with said notch of each slide, trip-shafts having the trips arranged to engage with a row of locking-dogs, trip-slides having means to engage with all the columns of trip-shafts, a booth having door-actuated mechanism, and a rock-shaft 80 having means operatively connected with the trip-slides and with said door-actuated mechanism of the booth whereby the locking-dogs will be disengaged from the push-slides by the opening and closing of the booth.

13. A voting-machine having push-slides, individual registers controlled thereby, a common register, a series of vertical gravity register-slides, intermediate connections between the register-slides and the register to actuate the latter on the elevation of said slides, and levers each having an arm connected with one push-slide and another arm connected with one register-slide, all of the register-slides of the series arranged to be raised by the operation of a push-slide and adapted to impose their weight on the actuated lever to return the pushed-in slide to normal position.

14. A voting-machine having columns of individual push-slides, locking devices therefor, an individual register for each slide, a group of register-actuating slides, an individual lever connecting one push-slide with one slide of the group of register-actuating slides, a common or public register mechanism, a register-stem, and a connecting-bar united to the group of register-actuating slides and arranged to lift said stem of the public-register mechanism.

15. A voting-machine having a public register provided with separate tally devices, voting devices, a register-stem, means actuated by the voting devices to impart reciprocating play to the stem, and booth-doors actuating a train of operative connections with said register-stem to turn the latter axially and shift the same into operative relation to one or the other of said tally devices.

16. A voting-machine having columns of individual push-slides, each associated with a register mechanism, a multiple locking mechanism comprising locking-shafts provided with locking-wheels adapted for engagement by studs on a series of vertically-movable locking-bars, and time-controlled mechanism having operative engagement with said locking-bars and adapted to prevent the push-slides from being operated within certain time limits.

17. A voting-machine having columns of push-slides, a separate register therefor, booth-doors provided with cams, a slidable bar engaging with said cams, an arbitrary locking mechanism including vertically-movable slides arranged to lock certain of the individual push-slides from operation, and a train of operative connections between said arbitrary locking-slides and the slidable bar.

18. A voting-machine having columns of individual push-slides each associated with a register mechanism, a row of locking-shafts provided with columns of locking-wheels, connections between the locking-shafts and the individual slides, arbitrary locking-slides provided with shiftable pins adapted for engagement with all of the locking-wheels except certain reserve wheels, a row of rock-shafts having operative engagement with the arbitrary locking-rods, and a slidable door-actuated rod or bar having means for simultaneously rocking said shafts to bring the arbitrary locking devices into active positions.

19. A voting-machine provided with columns of individual push-slides, individual registers therefor, straight-ticket slides, a common register mechanism, a group of register-slides operatively related to all the push-slides and arranged to actuate the common register mechanism, straight-ticket-voting levers each connected with one of the straight-ticket slides and adapted to actuate the group of register-slides, and register-operating bars each connected with one of the straight-ticket-voting levers and carrying means for collectively operating all the registers associated with one column of push-slides.

20. A voting-machine having columns of individual push-slides, an individual-register mechanism for each push-slide, straight-ticket slides each having two notches, a group of register-bars actuated by the straight-ticket slides and each carrying devices for operating all of the registers in one column of individual push-slides, and a series locking mechanism including a group of pawls movable into locking engagement with all of the notched straight-ticket slides by the operation of either of said slides.

21. A voting-machine having columns of individual push-slides, individual registers therefor, straight-ticket slides each having two notches, a group of register-bars each controlled by one straight-ticket slide and carrying means for actuating all the registers in one column of individual push-slides, a public-register mechanism, a group of vertically-movable slides adapted for actuation by either the individual push-slides or by the straight-ticket slides, and a row of locking-dogs controlled by the register-bars and adapted to be simultaneously thrown into engagement with one notch or the other of all the straight-ticket slides on the pushing in of either straight-ticket slide.

22. A voting-machine having voting devices, a public-register mechanism, booth-shafts provided with cams, an extensible slidable bar disposed between and normally engaging with said cams, and register-actuating devices controllable by said slidable bar and by the voting devices.

23. A voting-machine having columns of individual push-slides each provided with a register mechanism, a straight-ticket-voting mechanism having means for actuating all the registers in any one column, a series of locking-shafts provided with locking-wheels, a group of multiple locking-bars having means for engagement with said locking-wheels, and a rock-shaft adapted for actuation by either of the straight-ticket slides and having means for moving the multiple locking-bars into locking engagement with the locking-wheels.

24. A voting-machine having columns of independent push-slides each provided with a locking mechanism and with an individual-register mechanism, a booth provided with shafts, intermediate shafts geared to the booth-shafts and provided with cams, a two-part slidable bar disposed between said cams and adapted to be shifted thereby, means for holding the members of said bars normally in operative positions, an arbitrary locking mechanism having connection with said slidable bar, and a common register mechanism having devices adapted to be shifted by said slidable bar.

25. A voting-machine having columns of individual push-slides each associated with a register mechanism and with a locking mechanism, a booth having door-shafts geared to intermediate cam-shafts, a booth-actuated bar composed of two sections coupled together by an intermediate sleeve and normally pressed to operative positions by a resistance-spring, an arbitrary locking mechanism for restraining certain slides from operation and adapted to be controlled by said booth-actuated bar, and a register mechanism having shiftable devices adapted to be adjusted by said booth-actuated bar.

26. A voting apparatus comprising a base, a machine containing the register mechanism and adapted to be housed or inclosed within said base or to be supported in an elevated operative position thereby, shafts carried by said machine-casing and geared to suitable racks within the base, and means for rotating and locking said shafts.

27. A voting-machine having columns of individual push-slides and a cumulative-voting mechanism in active relation to a group of push-slides, and comprising a series of locking-shafts, toothed sectors on said shafts and having means for interlocking engagement with said slides, feed-pawls carried by the slides and arranged to engage with said locking-sectors to turn the latter with a step-by-step movement on the successive operation of the slides, a train of gearing connecting said shafts in series for simultaneous operation, and means to limit the turning movement of the locking-shafts and the group of sectors.

28. A voting-machine comprising columns of push-slides each associated with a register mechanism, locking-shafts provided with toothed sectors, each sector arranged to have interlocking engagement with one of the push-slides, and means carried by the push-slides for turning the locking-shaft with a step-by-step movement, a gear-train connecting certain locking-shafts in series, a coacting stop-pin and arm to limit the locking-shafts to movement under a certain number of pushes on the push-slides, and trip-actuating devices to release the detent mechanism of the cumulative-voting devices.

29. A voting-machine having columns of individual push-slides each associated with a register mechanism, locking-shafts provided with gears arranged to mesh with intermediate gears and connecting said shafts in series to impel them all in one direction, an arm on one of the shafts, a shiftable element disposed in the path of the arm and adapted to be placed at variable distances from said arm in the normal position of the latter, and means actuated by the push-slides to turn the locking-shafts with a step-by-step movement, and adapted to restrain the push-slides from further actuation after said slides shall have been actuated a certain number of times.

30. A voting-machine having columns of individual push-slides each associated with a register mechanism, locking-shafts geared together by a train of active and idle gears and adapted to rotate in one direction, a stop-arm on one of said shafts, a shiftable stop element disposed in the path of said arm, locking-sectors carried by the shafts and having means for movement into locking engagement with the push-slides, and pawls carried by the push-slides and arranged to engage with said locking-sectors.

31. A voting-machine having columns of individual push-slides each provided with a register mechanism, a series of locking-shafts connected together by a train of intermediate gearing, a coacting stop arm and pin in operative relation to one of said shafts, locking-sectors on the shafts and arranged to be actuated by the push-slides and to have locking engagement with the latter, a pawl-and-ratchet locking mechanism for the train of geared shafts, and booth-actuated trip devices to automatically withdraw the pawl from engagement with the ratchet and release the train of geared shafts.

32. A voting-machine having columns of individual push-slides each associated with a register mechanism, individual locking-dogs for engagement with said slides, trip-shafts having means for lifting the locking-dogs from the push-slides, locking-arms attached to the trip-shafts and having means for locking said shafts and the dogs in inactive positions relative to the push-slides, a series of locking-shafts having means to limit the angular movement thereof, and locking-sectors on said locking-shafts and occupying operative relation to the push-slides.

33. A voting-machine having a cumulative-voting mechanism including a group of voting devices, a group of locking-shafts, a train of gears connecting said shafts, an arm on one of said shafts, a stop in the path of said arm, a group of sectors carried individually by the shafts and each having means for interlocking with one of the voting devices, and a feed-pawl actuated by each voting device and engaging with one of said sectors.

34. A voting-machine having a cumulative-voting mechanism comprising a group of voting devices, a group of locking-sectors each arranged to have interlocking engagement with one of said voting devices, a train of gearing connecting the sectors, means on the voting devices to turn the sectors of the group with a step-by-step feed, an arm movable with one of the sectors, a stop in the path of the arm, a pawl-and-ratchet detent to restrain the gear-train from movement in a backward direction, and booth-actuated means to release the detent.

35. In a voting-machine, the combination of a notched voting-slide, a locking-shaft adjacent thereto, a toothed sector on the shaft, a stud carried by the sector and arranged to fit in the notch of the slide, and a pawl mounted on the slide for engagement with the toothed sector.

36. In a voting-machine, the combination of voting devices, a series of locking-shafts, means for operatively connecting said locking-shafts with the voting devices, toothed wheels on said shafts, vertically-movable locking-slides having pins arranged to engage the locking-wheels, and a time-controlled mechanism for lifting the locking-slides and comprising a time-train and means to set the time-train for operation at a given period.

37. In a voting-machine, the combination of voting devices, a series of locking-shafts, means connecting said locking-shafts with said voting devices, toothed wheels on said shafts, vertically-movable locking-slides having pins arranged to engage the locking-wheels, and a time-controlled mechanism for lifting the locking-slides and comprising an upstanding rod 241 having a suitable retractor, a locking-lever, a locking-disk for controlling said lever and having operative connection with said rod, and a time-train to automatically release said locking-disk from restraint at a suitable period.

38. In a voting-machine, the combination of voting devices, a series of locking-shafts, means for operatively connecting said locking-shafts with said voting devices, toothed wheels on said shafts, vertically-movable locking-slides having pins arranged to engage said toothed wheels, and a time-controlled mechanism for lifting the locking-slides and comprising an upstanding spring-actuated rod, a locking-lever connected with said rod and provided with a gear-segment, a gear meshing with said segment, a notched disk fast with said gear, a spring provided with a finger engaging said disk, a shiftable clutch-gear having a notched hub and acted on by said spring, an arbor having a pin and adapted to be adjusted to any predetermined position, and a time-train having operative relation to the shiftable clutch-gear.

39. In a voting-machine, a series of voting devices, register mechanisms controllable by said voting devices, locking devices individually actuated by the voting devices on the operation of the latter, a multiple locking mechanism including a plurality of locking-detents and a corresponding number of slides having means for engagement with said locking-detents, and time-controlled mechanism connected operatively with the multiple locking mechanism to move the slides simultaneously into engagement with said detents and lock all the voting devices.

40. A voting-machine having a hollow or chambered base, a casing carrying voting devices and movable vertically with relation to said base, and casing-adjusting means connected with the base and the casing to move the latter to a raised position on the base and to lower said casing within the base.

41. In a voting-machine, the combination with voting-keys arranged in party rows, a series of locking-slides one arranged adjacent to the keys of each row, a time-train, and means operated by said time-train for automatically shifting said locking-slides into locking relation to said keys at a predetermined time.

In testimony whereof I have signed my name to this specification in the presence of two subscribing witnesses.

JOHN PHILLIP PAYNTER.

Witnesses:
H. C. DIETRICH,
FRED. K. BROWN.